US012530896B2

(12) United States Patent
Balasubramanian et al.

(10) Patent No.: US 12,530,896 B2
(45) Date of Patent: Jan. 20, 2026

(54) VISUAL FEATURE SHARING FOR RELATIVE POSE

(71) Applicant: QUALCOMM Incorporated, San Diego, CA (US)

(72) Inventors: Anantharaman Balasubramanian, San Diego, CA (US); Kapil Gulati, Belle Mead, NJ (US); Urs Niesen, Berkeley Heights, NJ (US)

(73) Assignee: Qualcomm Incorporated, San Diego, CA (US)

( * ) Notice: Subject to any disclaimer, the term of this patent is extended or adjusted under 35 U.S.C. 154(b) by 768 days.

(21) Appl. No.: 17/902,325

(22) Filed: Sep. 2, 2022

(65) Prior Publication Data

US 2024/0078808 A1 Mar. 7, 2024

(51) Int. Cl.
*G06V 20/50* (2022.01)
*H04W 88/02* (2009.01)

(52) U.S. Cl.
CPC ............. *G06V 20/50* (2022.01); *H04W 88/02* (2013.01)

(58) Field of Classification Search
CPC ..................................................... G06V 20/50
See application file for complete search history.

(56) References Cited

U.S. PATENT DOCUMENTS

| 2017/0132334 | A1* | 5/2017 | Levinson | .............. | B60W 50/00 |
| 2020/0001868 | A1 | 1/2020 | Lee | | |
| 2020/0217972 | A1 | 7/2020 | Kim et al. | | |
| 2020/0263992 | A1 | 8/2020 | Gaal et al. | | |
| 2021/0157316 | A1 | 5/2021 | Liu et al. | | |
| 2021/0404814 | A1 | 12/2021 | Hiess et al. | | |
| 2022/0371602 | A1* | 11/2022 | Pan | ........................ | G01S 7/4808 |

(Continued)

FOREIGN PATENT DOCUMENTS

CN 113625774 A * 11/2021 ............. G05D 1/104

OTHER PUBLICATIONS

Yoon, DoHyun Daniel, Beshah Ayalew, and GG Md Nawaz Ali. "Performance of decentralized cooperative perception in V2V connected traffic." IEEE Transactions on Intelligent Transportation Systems 23, No. 7 (2021): 6850-6863. (Year: 2021).*

(Continued)

*Primary Examiner* — David Perlman
(74) *Attorney, Agent, or Firm* — Loza & Loza, LLP

(57) ABSTRACT

Aspects relate to techniques for visual feature sharing between wireless communication devices for relative pose determination. A first wireless communication device may transmit a request for visual feature sharing to a second wireless communication device and in response receive a message from the second wireless communication device including a plurality of features (e.g., keypoints) of an image captured by the second wireless communication device. The first wireless communication device may then calculate a relative pose of the first wireless communication device with respect to the second wireless communication device based on an association between the features provided by the second wireless communication device and additional features obtained from an additional image captured by the first wireless communication device.

26 Claims, 17 Drawing Sheets

(56) References Cited

U.S. PATENT DOCUMENTS

2024/0137899 A1* 4/2024 Thomas ................ H04W 64/00

OTHER PUBLICATIONS

Liu, Qi, Peng Liang, Junjie Xia, Ti Wang, Meng Song, Xingrong Xu, Jiachi Zhang, Yuanyuan Fan, and Liu Liu. "A highly accurate positioning solution for C-V2X systems." Sensors 21, No. 4 (2021): 1175. (Year: 2021).*
International Search Report and Written Opinion—PCT/US2023/073111—ISA/EPO—Nov. 16, 2023.
Li Y., et al., "A Collaborative Relative Localization Method for Vehicles using Vision and LiDAR Sensors", 2020 16th International Conference on Control, Automation, Robotics and Vision (ICARCV), IEEE, Dec. 13, 2020, pp. 281-286, XP033873940, section III. Approach Framework.

* cited by examiner

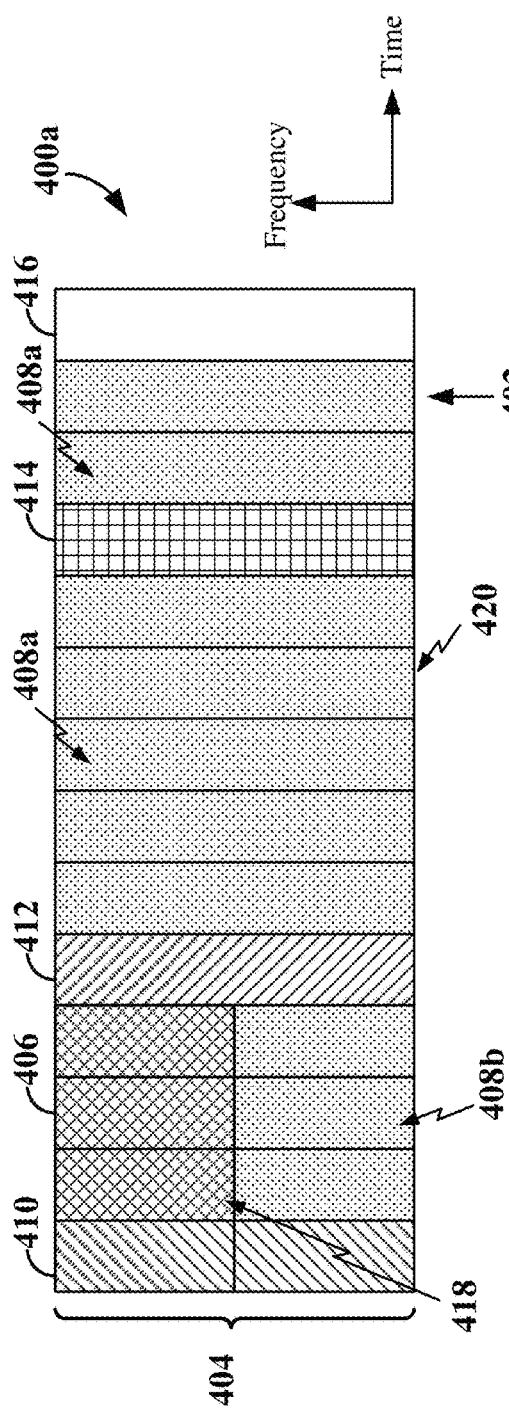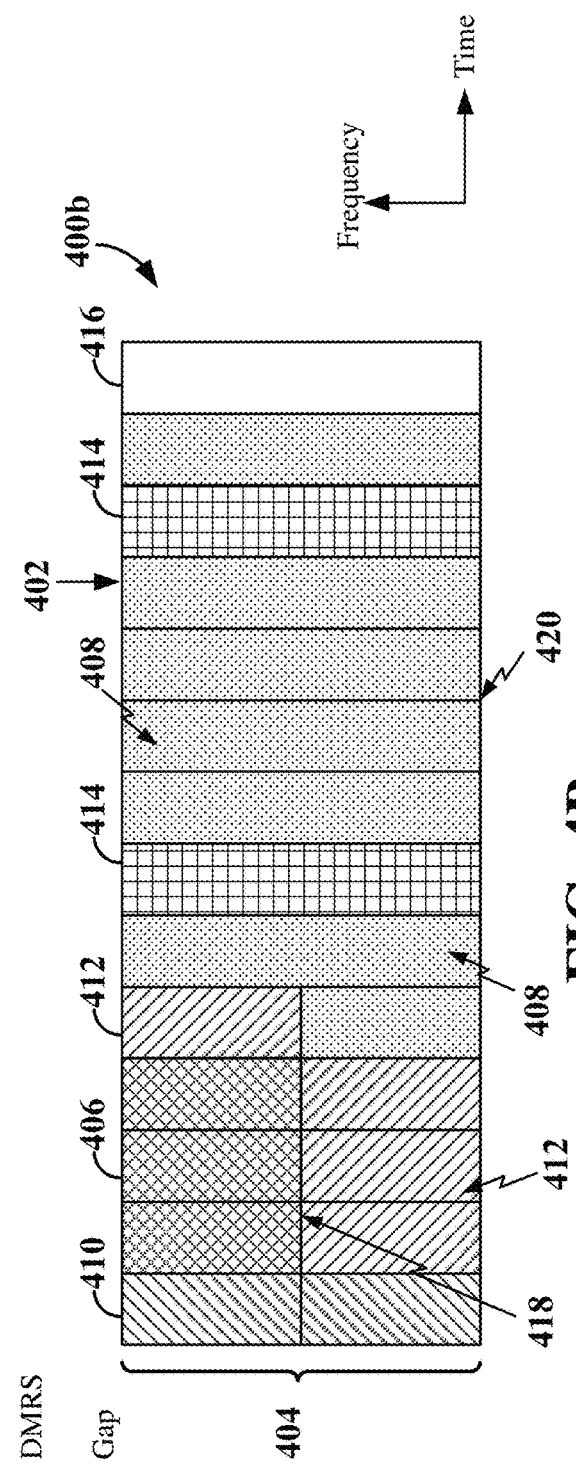
FIG. 4A
FIG. 4B

VISUAL FEATURE SHARING FOR RELATIVE POSE

TECHNICAL FIELD

The technology discussed below relates generally to wireless communication networks, and more particularly, to relative pose determination between wireless communication devices.

BACKGROUND

Visual odometry may be used in various applications, such as automotive applications. Visual odometry generally involves comparing consecutive image frames (e.g., in a video sequence) to infer the trajectory and pose of an object, such as a vehicle. The pose refers to the translation of the vehicle (e.g., geometrical movement of the vehicle in two or three dimensions) and orientation/rotation of the vehicle (e.g., pitch, yaw, roll). Visual odometry may be used, for example, in Advanced Driver-Assistance Systems (ADAS) applications to determine the vehicle pose for collision avoidance, cooperative driving, and/or other vehicular safety features.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a first wireless communication device is disclosed. The first wireless communication device includes a transceiver, a memory, and a processor coupled to the transceiver and the memory. The processor can be configured to transmit a request for visual feature sharing to a second wireless communication device via the transceiver and receive a message from the second wireless communication device via the transceiver. The message can include a plurality of first features of a first image captured by the second wireless communication device in a first field of view. Each first feature in the plurality of first features including a respective first keypoint of the first image. The processor can further be configured to obtain a plurality of second features of a second image captured by the first wireless communication device in a second field of view. Each second feature in the plurality of second features including a respective second keypoint of the second image. The processor can further be configured to calculate a relative pose of the first wireless communication device with respect to the second wireless communication device based on an association between the plurality of first features and the plurality of second features.

Another example provides a method operable at a first wireless communication device. The method can include transmitting a request for visual feature sharing to a second wireless communication device and receiving a message from the second wireless communication device. The message can include a plurality of first features of a first image captured by the second wireless communication device in a first field of view. Each first feature in the plurality of first features including a respective first keypoint of the first image. The method can further include obtaining a plurality of second features of a second image captured by the first wireless communication device in a second field of view. Each second feature in the plurality of second features including a respective second keypoint of the second image. The method can further include calculating a relative pose of the first wireless communication device with respect to the second wireless communication device based on an association between the plurality of first features and the plurality of second features.

Another example provides a first wireless communication device including means for transmitting a request for visual feature sharing to a second wireless communication device and receiving a message from the second wireless communication device. The message can include a plurality of first features of a first image captured by the second wireless communication device in a first field of view. Each first feature in the plurality of first features including a respective first keypoint of the first image. The first wireless communication device can further include means for obtaining a plurality of second features of a second image captured by the first wireless communication device in a second field of view. Each second feature in the plurality of second features including a respective second keypoint of the second image. The first wireless communication device can further include means for calculating a relative pose of the first wireless communication device with respect to the second wireless communication device based on an association between the plurality of first features and the plurality of second features.

Another example provides a non-transitory computer-readable medium having stored therein instructions executable by one or more processors of a first wireless communication device to transmit a request for visual feature sharing to a second wireless communication device and receiving a message from the second wireless communication device. The message can include a plurality of first features of a first image captured by the second wireless communication device in a first field of view. Each first feature in the plurality of first features including a respective first keypoint of the first image. The non-transitory computer-readable medium can further include instructions executable by the one or more processors of the first wireless communication device to obtain a plurality of second features of a second image captured by the first wireless communication device in a second field of view. Each second feature in the plurality of second features including a respective second keypoint of the second image. The non-transitory computer-readable medium can further include instructions executable by the one or more processors of the first wireless communication device to calculate a relative pose of the first wireless communication device with respect to the second wireless communication device based on an association between the plurality of first features and the plurality of second features.

Another example provides a wireless communication device including a transceiver, a memory, and a processor coupled to the transceiver and the memory. The processor can be configured to receive a request for visual feature sharing from another wireless communication device via the transceiver and transmit a message to the other wireless communication device via the transceiver. The message can include a plurality of features in a field of view associated with the wireless communication device. Each feature in the plurality of features including a respective keypoint of an image captured by the wireless communication device.

Another example provides a method operable at a wireless communication device. The method can include receiving a request for visual feature sharing from another communication device and transmitting a message to the other communication device. The message can include a plurality of features in a field of view associated with the wireless communication device. Each feature in the plurality of features including a respective keypoint of an image captured by the wireless communication device.

Another example provides a wireless communication device including means for receiving a request for visual feature sharing from another communication device and means for transmitting a message to the other communication device. The message can include a plurality of features in a field of view associated with the wireless communication device. Each feature in the plurality of features including a respective keypoint of an image captured by the wireless communication device.

Another example provides non-transitory computer-readable medium having stored therein instructions executable by one or more processors of a first wireless communication device to receive a request for visual feature sharing from another communication device and transmit a message to the other communication device. The message can include a plurality of features in a field of view associated with the wireless communication device. Each feature in the plurality of features including a respective keypoint of an image captured by the wireless communication device.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

BRIEF DESCRIPTION OF THE DRAWINGS

FIGS. 4A and 4B are diagrams illustrating examples of sidelink slot structures according to some aspects.

DETAILED DESCRIPTION

Figure 1:
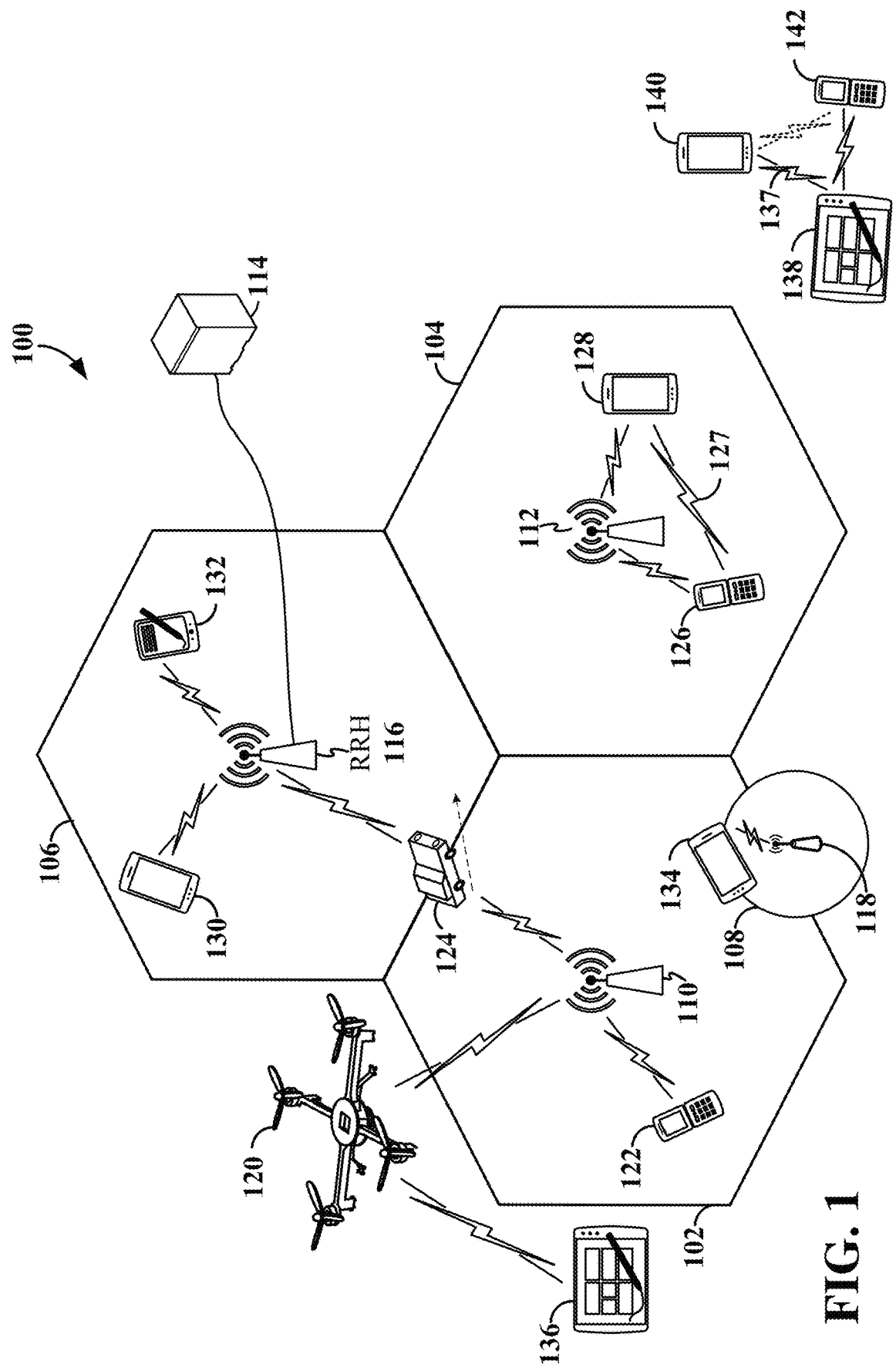
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Mobile devices equipped with a camera may be capable of determining the two-dimensional or three-dimensional displacement of the camera over time. For example, in automotive applications, visual odometry may be used to estimate the trajectory and pose of the vehicle. For some applications, such as Advanced Driver-Assistance Systems (ADAS), high accuracy in relative vehicle pose determination (e.g., relative to another vehicle or object) may improve reaction time to lane changes, collision avoidance, and/or cooperative driving. Without highly accurate relative pose determination, ADAS systems may bias that vehicles are going straight in their lanes, which increases the reaction time of the ADAS system to react to a lane change. The high accuracy requirements of ADAS systems may not be met using only the on-board camera to determine the relative vehicle pose due to the delay between image captures and field of view restrictions.

To decrease the time to obtain a relative vehicle pose and to improve the accuracy of relative vehicle pose calculations, various aspects of the disclosure relate to mechanisms for visual feature sharing between wireless communication devices to enable determination of the relative pose between the wireless communication devices. A first wireless communication device may transmit a request for visual feature sharing to a second wireless communication device and in response receive a message from the second wireless communication device including a plurality of features (e.g., first features) within a field of view (e.g., a first field of view)

associated with the second wireless communication device. Each first feature may include a respective first keypoint of a first image captured by the second wireless communication device.

The first wireless communication device may then obtain a plurality of second features in a second field of view associated with the first wireless communication device. Each second feature may also include a respective second keypoint of a second image captured by the first wireless communication device. The first wireless communication device may calculate a relative pose of the first wireless communication device with respect to the second wireless communication device based on an association between the plurality of first features and the plurality of second features.

In some examples, each feature (first feature and second feature) may further include a feature descriptor corresponding to the respective feature. The first wireless communication device may then calculate the relative pose by associating the first plurality of features with the second plurality of features based on the first/second keypoints and corresponding first/second feature descriptors.

In some examples, the first wireless communication device may further calculate a global pose within a coordinate system (e.g., a global coordinate system) based on the relative pose. For example, the second wireless communication device may further provide its global pose to the first wireless communication device and the first wireless communication device may calculate its global pose based on the global pose of the second wireless communication device and the calculated relative pose.

In some examples, the message includes a timestamp indicating a first time at which the plurality of first features were obtained at the second wireless communication device. The wireless communication device may further determine mobility information (e.g., using an inertial measurement unit (IMU) between the first time and a second time at which the plurality of second features were obtained at the first wireless communication device, and calculate the relative pose further based on the mobility information.

In some examples, the first wireless communication device and second wireless communication device may perform a sidelink ranging operation. In this example, the first wireless communication device may transmit the request for visual feature sharing during the sidelink ranging operation. In addition, the second wireless communication device may transmit the message within a sidelink ranging measurement report.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and UE), end-user devices, etc. of varying sizes, shapes, and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3' d Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
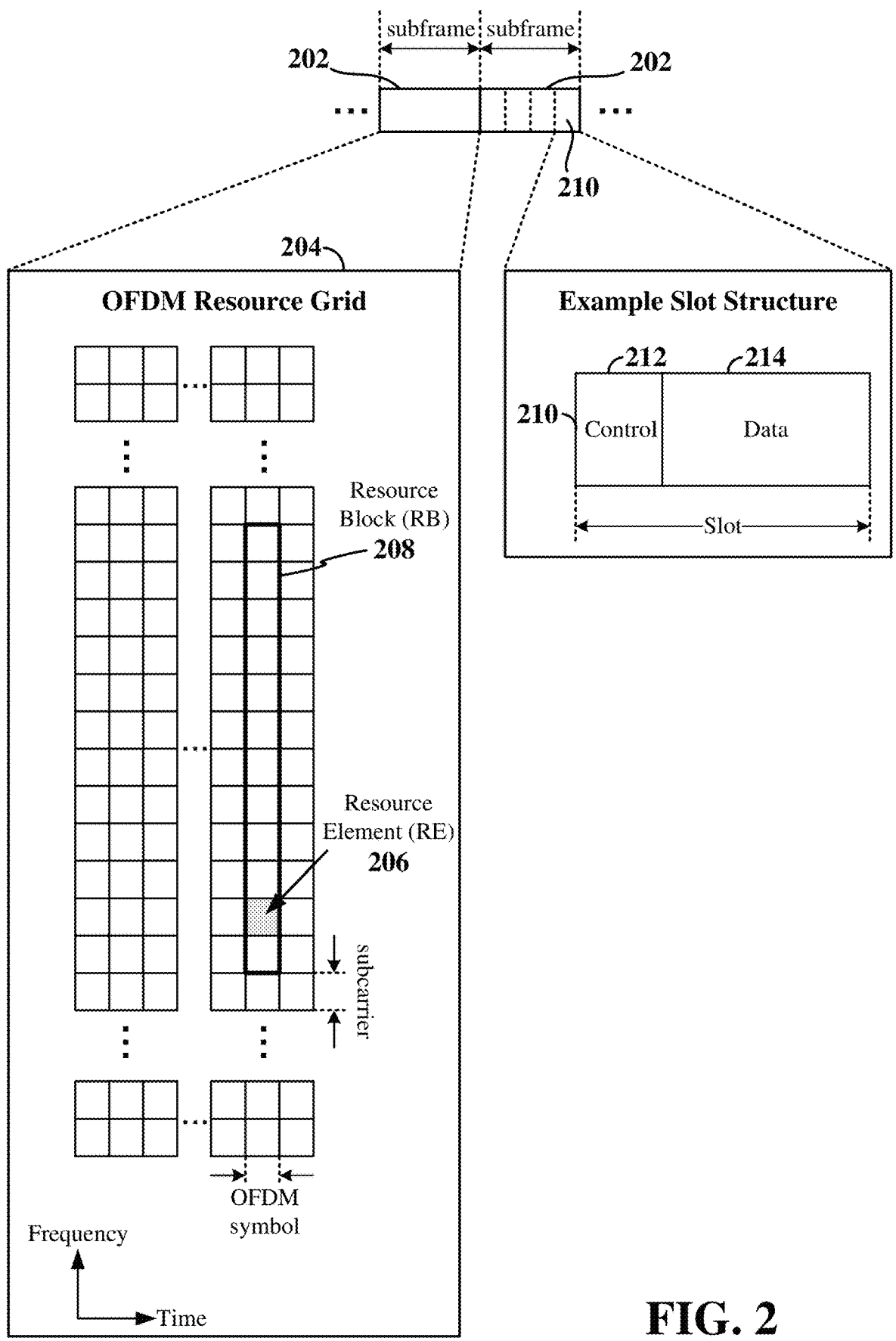
FIG. 2 is a diagram illustrating an example of a frame structure for use in a wireless communication network according to some aspects.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time—frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 20, 80, or 120 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, a sidelink DMRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
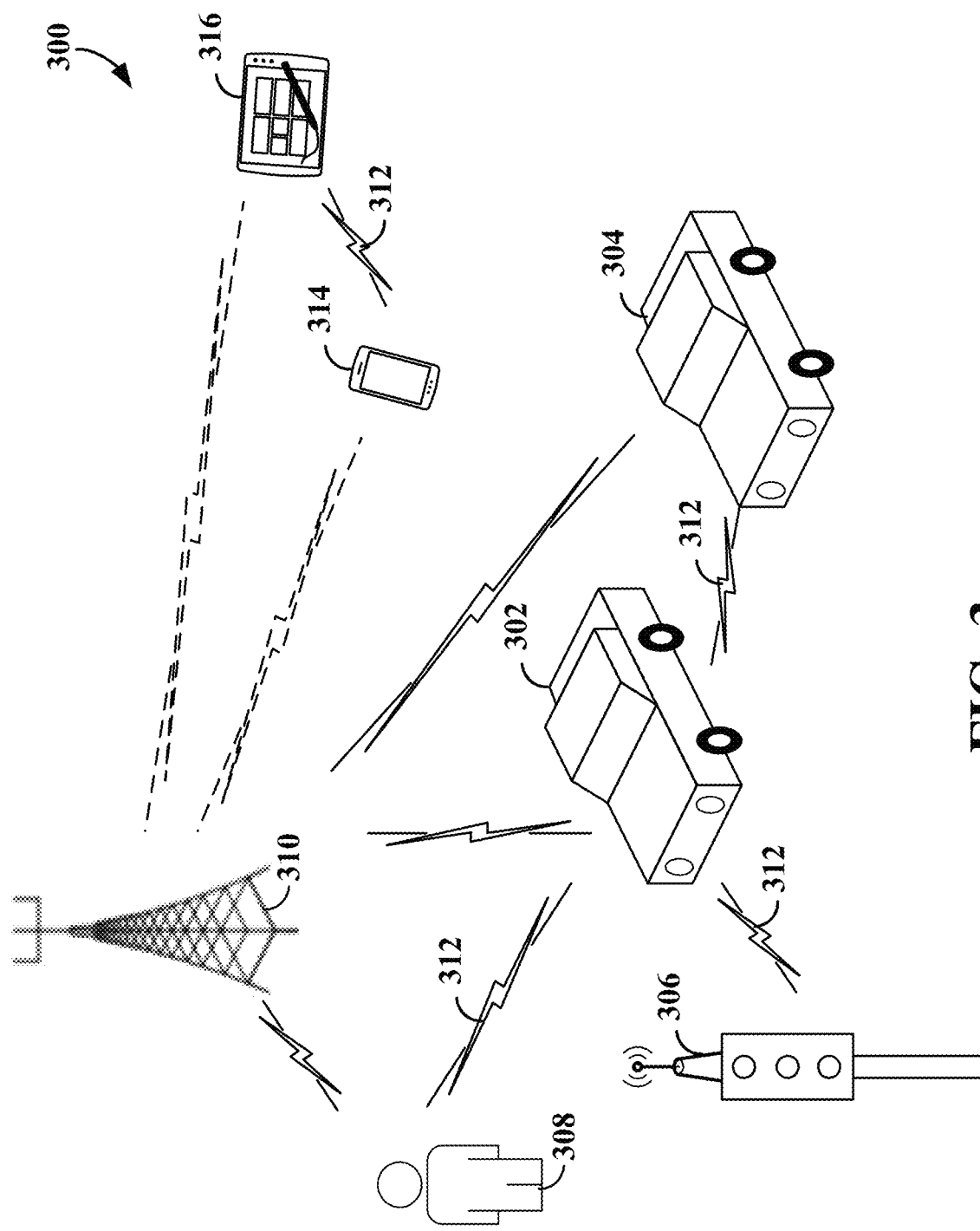
FIG. 3 is a diagram illustrating an example of a wireless communication network employing sidelink communication according to some aspects.

FIG. 3 illustrates an example of a wireless communication network 300 configured to support sidelink communication. In some examples, sidelink communication may include D2D or V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include smart wearables, public safety, or commercial (e.g., entertainment, education, office, medical, and/ or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel, which may include, for example, 10, 15, 20, 25, 50, 75, or 100 consecutive RBs, and the minimum resource allocation unit in time may be one slot. The number of sub-channels in a resource pool may include between one and twenty-seven. The configuration of the resource pool (RP) utilized between two sidelink devices for communication therebetween may be either pre-configured (e.g., a factory setting on the UE determined, for example, by sidelink standards or specifications) or provided by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. For example, the base station 310 may schedule the sidelink communication via DCI 3_0. In some examples, the base station 310 may schedule the PSCCH/PSSCH within uplink resources indicated in DCI 3_0. The base station 310 may further activate preconfigured sidelink grants (e.g., configured grants) for sidelink communication among the sidelink devices. In some examples, the base station 310 may activate a configured grant (CG) via RRC signaling. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). For example, SCI-1 may include a physical sidelink shared channel (PSSCH) resource assignment and a resource reservation period (if enabled). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may be transmitted on the PSSCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

In some examples, the SCI (e.g., SCI-1 and/or SCI-2) may further include a resource assignment of resources reserved for one or more retransmissions of the sidelink transmission (e.g., the sidelink traffic/data) or for one or more additional (new) sidelink transmissions. Thus, the SCI may include a respective PSSCH resource reservation and assignment for one or more PSSCH transmissions. For example, the SCI may include a reservation message indicating the PSSCH resource reservation for the initial sidelink transmission (initial PSSCH) and one or more additional PSSCH resource reservations for one or more retransmissions of the PSSCH.

FIGS. 4A and 4B are diagrams illustrating examples of sidelink slot structures according to some aspects. The sidelink slot structures may be utilized, for example, in a V2X or other D2D network implementing sidelink. In the examples shown in FIGS. 4A and 4B, time is in the horizontal direction with units of symbols 402 (e.g., OFDM symbols); and frequency is in the vertical direction. Here, a carrier bandwidth 404 allocated for sidelink wireless communication is illustrated along the frequency axis. The carrier bandwidth 404 may include a plurality of sub-channels, where each sub-channel may include a configurable number of PRBs (e.g., 10, 15, 20, 25, 50, 75, or 100 PRBs).

Each of FIGS. 4A and 4B illustrate an example of a respective slot 400a or 400b including fourteen symbols 402 that may be used for sidelink communication. However, it should be understood that sidelink communication can be configured to occupy fewer than fourteen symbols in a slot 400a or 400b, and the disclosure is not limited to any particular number of symbols 402. Each sidelink slot 400a and 400b includes a physical sidelink control channel (PSCCH) 406 occupying a control region 418 of the slot 400a and 400b and a physical sidelink shared channel (PSSCH) 408 occupying a data region 420 of the slot 400a and 400b. The PSCCH 406 and PSSCH 408 are each transmitted on one or more symbols 402 of the slot 400a. The PSCCH 406 includes, for example, SCI-1 (e.g., SCI format 1-A) that schedules transmission of data traffic (e.g., a packet) on time-frequency resources of the corresponding PSSCH 408. As shown in FIGS. 4A and 4B, the PSCCH 406 and corresponding PSSCH 408 are transmitted in the same slot 400a and 400b. In other examples, the PSCCH 406 may schedule a PSSCH in a subsequent slot.

In some examples, the PSCCH 406 duration is configured to be two or three symbols. In addition, the PSCCH 406 may be configured to span a configurable number of PRBs, limited to a single sub-channel. The PSCCH resource size may be fixed for a resource pool (e.g., 10% to 100% of one sub-channel in the first two or three symbols). For example, the PSCCH 406 may occupy 10, 12, 15, 20, or 25 RBs of a single sub-channel. In each of the examples shown in FIGS. 4A and 4B, the starting symbol for the PSCCH 406 is the second symbol of the corresponding slot 400a or 400b and the PSCCH 406 spans three symbols 402. The PSCCH 406 may further include DMRSs.

The PSSCH 408 may be time-division multiplexed (TDMed) with the PSCCH 406 and/or frequency-division multiplexed (FDMed) with the PSCCH 406. In the example shown in FIG. 4A, the PSSCH 408 includes a first portion 408a that is TDMed with the PSCCH 406 and a second portion 408b that is FDMed with the PSCCH 406. In the example shown in FIG. 4B, the PSSCH 408 is TDMed with the PSCCH 406.

One and two layer transmissions of the PSSCH 408 may be supported with various modulation orders (e.g., QPSK, 16-QAM, 64-QAM and 256-QAM). In addition, the PSSCH 408 may include DMRSs 414 configured in a two, three, or four symbol DMRS pattern. For example, slot 400a shown in FIG. 4A illustrates a two symbol DMRS pattern, while slot 400b shown in FIG. 4B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 408 symbols in the slot 400a or 400b. In some examples, the DMRSs 414 may be based on a Gold sequence and a configuration type 1 may be used for the frequency domain pattern of the PSSCH DMRSs 414. In addition, a gap symbol 416 is present after the PSSCH 408 in each slot 400a and 400b.

Each slot 400a and 400b further includes SCI-2 412 mapped to contiguous RBs in the PSSCH 408 starting from the first symbol containing a PSSCH DMRS. In the example shown in FIG. 4A, the first symbol containing a PSSCH DMRS is the fifth symbol occurring immediately after the last symbol carrying the PSCCH 406. Therefore, the SCI-2

412 is mapped to RBs within the fifth symbol. In the example shown in FIG. 4B, the first symbol containing a PSSCH DMRS is the second symbol, which also includes the PSCCH 406. In addition, the SCI-2/PSSCH DMRS 412 are shown spanning symbols two through five. As a result, the SCI-2/PSSCH DMRS 412 may be FDMed with the PSCCH 406 in symbols two through four and TDMed with the PSCCH 406 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 406 may be blind decoded at the receiving wireless communication device. However, since the format, starting location, and number of REs of the SCI-2 412 may be derived from the SCI-1, blind decoding of SCI-2 is not needed at the receiver (receiving UE).

In each of FIGS. 4A and 4B, the second symbol of each slot 400a and 400b is copied onto (repeated on) a first symbol 410 thereof for automatic gain control (AGC) settling. For example, in FIG. 4A, the second symbol containing the PSCCH 406 FDMed with the PSSCH 408b may be transmitted on both the first symbol and the second symbol. In the example shown in FIG. 4B, the second symbol containing the PSCCH 406 FDMed with the SCI-2/PSSCH DMRS 412 may be transmitted on both the first symbol and the second symbol.

Visual odometry may be used in sidelink (e.g., V2X) applications to estimate the trajectory and pose of a wireless communication device (e.g., a V2X device, such as a vehicle). The pose refers to the translation of the vehicle (e.g., geometrical change in the position of the vehicle in two or three dimensions) and orientation/rotation of the vehicle (e.g., pitch, yaw, roll). Visual odometry involves comparing consecutive image frames (e.g., in a video sequence) to infer the trajectory of the vehicle. For example, the two-dimensional displacement of five or more stationary keypoints detected and tracked across two camera images is sufficient to recover the three-dimensional displacement of the camera up to a global scale factor. In some examples, the vehicle may include an aiding sensor, such as an inertial measurement unit (IMU), to determine the displacement on a global scale.

Figure 5:
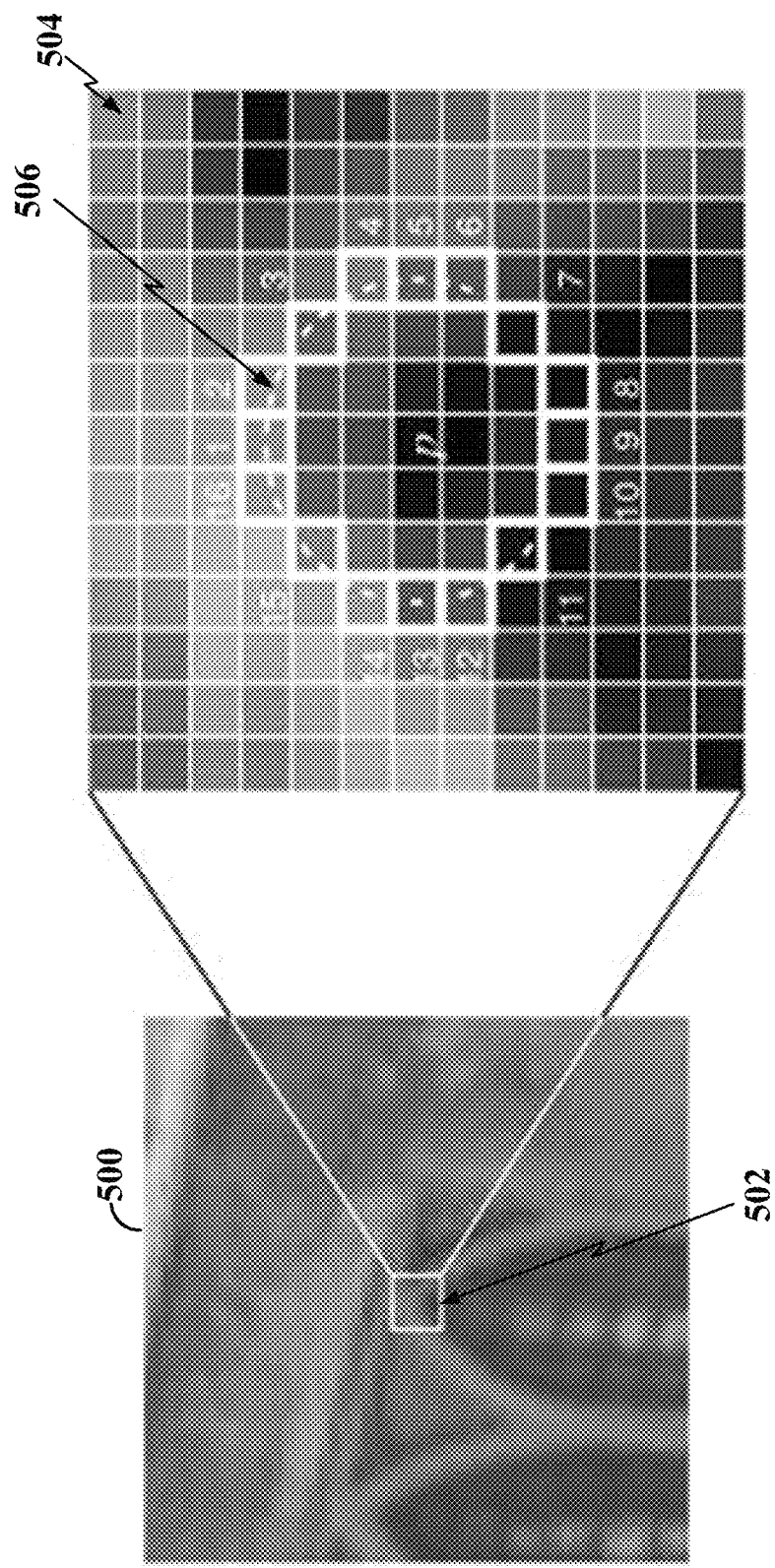
FIG. 5 is a diagram illustrating an example of an image including a keypoint according to some aspects.

FIG. 5 is a diagram illustrating an example of an image 500 including a keypoint 502 according to some aspects. As used herein, the term keypoint 502 refers to a group of pixels 504 in the image 500 that can be tracked from image frame to image frame, such as a corner point on an object. One example of a corner detection method shown in FIG. 5 is the features from accelerated segment test (FAST) (Machine Learning for High-Speed Corner Detection, Edward Rosten & Tom Drummond, ECCV 2006: Computer Vision Vision-ECCV 2006 pp 430-443, Part of the Lecture Notes in Computer Science book series (LNIP, volume 3951)). In the FAST method, a pixel 504 under test p with intensity Ip may be identified as an interest point. A circle of sixteen pixels (pixels 1-16) around the pixel under test (e.g., a Bresenham circle of radius 3) may then be identified. The pixel p may be considered a corner point if there exists a set of n contiguous pixels in the circle of sixteen pixels that are all brighter than Ip+t, or all darker than Ip−t, where t is a threshold value and n is configurable. In this example, n may be twelve. For example, the intensity of pixels 1, 5, 9, and 13 of the circle may be compared with Ip. If at least three of the four pixels do not satisfy the threshold criteria, the pixel p is not considered an interest point. As evident from FIG. 5, at least three of the four pixels satisfy the threshold criteria. Therefore, all sixteen pixels may be compared to pixel p to determine if twelve contiguous pixels meet the threshold criteria. This process may be repeated for each pixel 504 in the image 500 to identify the corner points corresponding to keypoints 502 in the image 500.

Although FIG. 5 illustrates a FAST keypoint identifying method, it should be understood that the present disclosure is applicable to any keypoint identifying method. Examples of keypoint identifying methods may include, but are not limited to, SIFT (scale-invariant feature transform), ORB (oriented FAST (features from accelerated segment test) and rotated BRIEF (binary robust independent elementary feature)), BRIEF, and Harris corner point.

As indicated above, a keypoint 502 represents a feature of an image 500 that may be tracked. For example, various cross-correlation or optical flow methods may track features (keypoints) across image frames. In some examples, each feature may further include a feature descriptor that assists with the tracking process. A feature descriptor may summarize, in vector format (e.g., of constant length) one or more characteristics of the keypoint 502. For example, the feature descriptor may correspond to the intensity of the keypoint 502. In general, feature descriptors are independent of the keypoint 502 position, robust against image transformations, and scale independently. Thus, keypoints with feature descriptors may be independently re-detected in each image frame and then subjected to a keypoint matching/tracking procedure. For example, the keypoints in two different images with matching descriptors and the smallest distance between them may be considered to be matching keypoints.

The pose of the camera may then be calculated based on the two-dimensional displacement of a plurality of keypoints in consecutive images. For example, the pose may be determined by forming and factoring an essential matrix using eight keypoints 502 or using Nister's method with five keypoints 502. As another example, a Perspective-n-Point (PnP) algorithm with three keypoints 502 may be used to determine the pose if keypoint depth is also being tracked.

Figure 6:
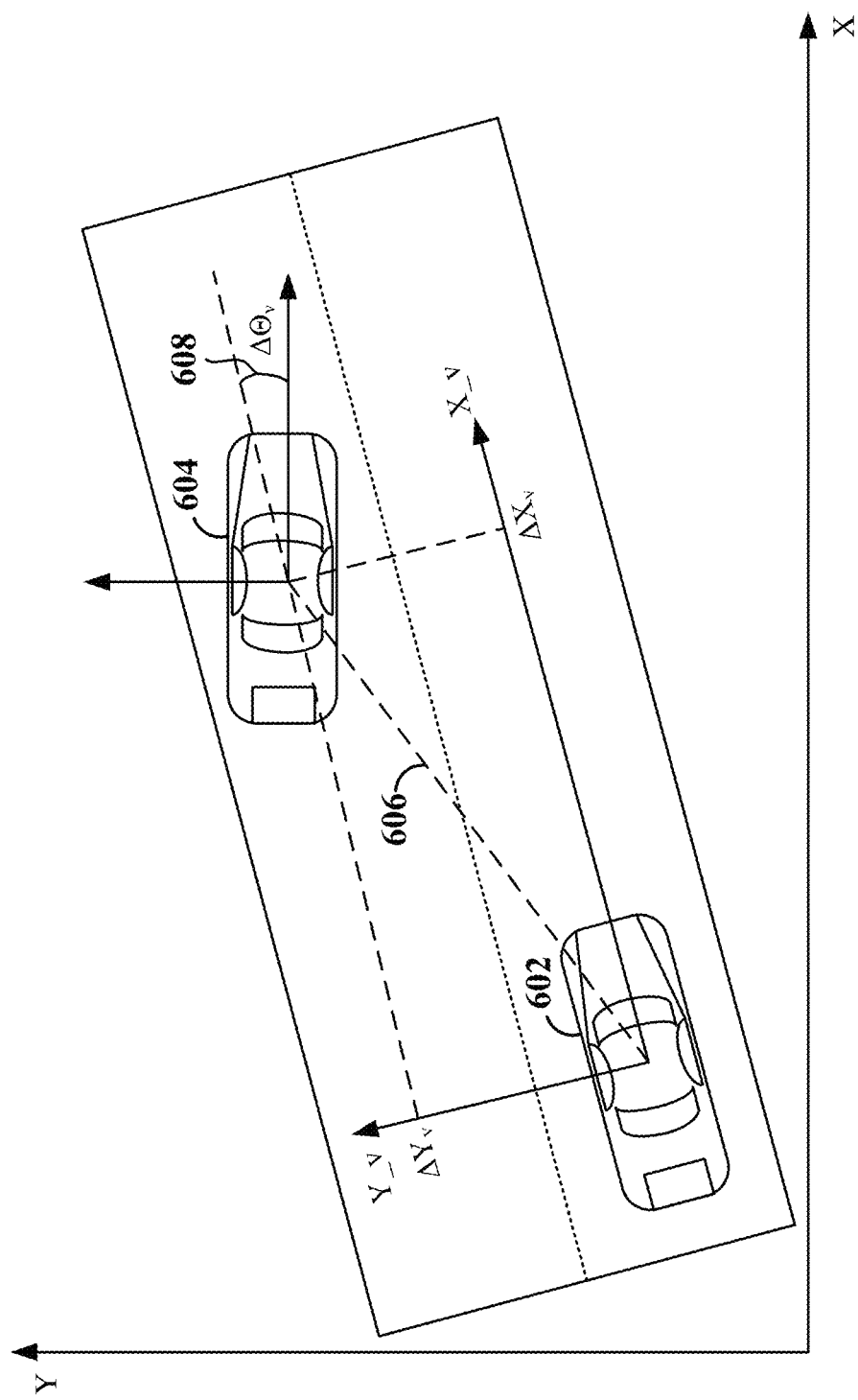
FIG. 6 is a diagram illustrating an example of relative pose determination between vehicles according to some aspects.

In some aspects, images captured by different cameras that contain a minimum number of the same features (e.g., based on the pose determination method) may be used to determine the relative pose between the cameras. FIG. 6 is a diagram illustrating an example of relative pose determination between vehicles 602 and 604 according to some aspects. In some examples, each of the vehicles 602 and 604 may be a wireless communication device, such as a V2X device including a sensor (e.g., a camera) for capturing images. In addition, the vehicles 602 and 604 may each be ego vehicles within an intelligent transportation system. The vehicles 602 and 604 are shown in a two-dimensional coordinate system represented by the X-axis and Y-axis. Thus, the pose of each vehicle 602 and 604 may be determined in the X, Y coordinate system.

In addition, the relative pose between the vehicles 602 and 604 may also be determined based on a rotated coordinate system centered at one of the vehicles (e.g., vehicle 602) represented by the X_v axis and Y_v axis. In some examples, the rotated coordinate system may be centered at a camera of the vehicle 602. The relative pose of vehicle 604 with respect to vehicle 602 may include a relative translation 606 of vehicle 604 in the X_v and Y_v directions corresponding to $\Delta X_v$ and $\Delta Y_v$. In addition, the relative pose of vehicle 604 with respect to vehicle 602 may include a relative orientation 608 of vehicle 604 corresponding to angle $\Delta \Theta_v$.

To facilitate relative pose determination, various aspects of the disclosure provide mechanisms for visual feature sharing between wireless communication devices (e.g., vehicles 602 and 604). For example, vehicle 604 may capture an image within a field of view of an on-board camera of vehicle 604 and identify a plurality of keypoints in the image using FAST, ORB, BRIEF, SIFT, Harris corner points or another keypoint detection algorithm. The vehicle 604 may then transmit the identified features (keypoints) to vehicle 602. The vehicle 602 may use the received keypoints from vehicle 604 and matching keypoints obtained from an image in the same or similar (e.g., a common) field of view captured by an on-board camera of vehicle 602 for relative pose determination between vehicle 602 and vehicle 604.

Figure 7:
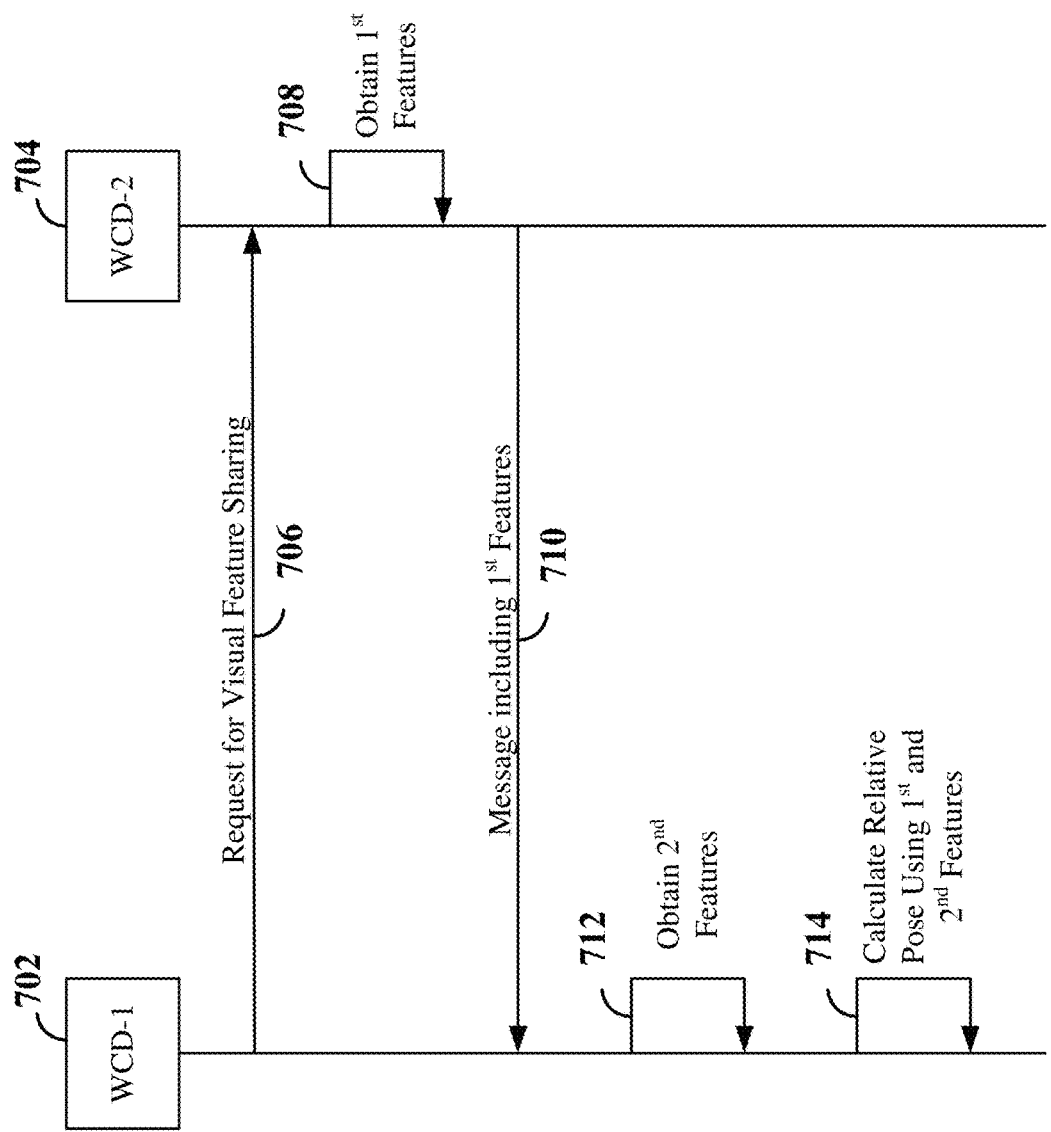
FIG. 7 is a diagram illustrating exemplary signaling between wireless communication devices for relative pose determination according to some aspects.

FIG. 7 is a diagram illustrating exemplary signaling between wireless communication devices (WCD-1 702 and WCD-2 704) for relative pose determination according to some aspects. Each of the WCD-1 702 and the WCD-2 704 may be, for example, a vehicle (e.g., an ego vehicle), a UE, a V2X device, or a sidelink device. The WCD-1 702 and the WCD-2 704 may be in the vicinity of one another. In some examples, the WCD-1 702 and WCD-2 704 may have established a sidelink therebetween (e.g., via discovery signals).

At 706, the WCD-1 702 may transmit a request for visual feature sharing to the WCD-2 704. For example, the WCD-1 702 may be unaware of its pose and may request the WCD-2 704 to provide keypoints to the WCD-1 702. In some examples, the WCD-1 702 may transmit a request to provide keypoints from multiple images obtained by the WCD-2 704 over time (e.g., at different time instants). In some examples, the request may indicate specific time instants (e.g., $t_1$, $t_2$, . . . , $t_N$) at which the images should be captured. In other examples, the WCD-1 702 may transmit multiple requests at different time instants, each requesting the WCD-2 704 to provide keypoints from one or more images.

In some examples, the request may include an indication of a visual field of view in which the keypoints are requested. For example, the field of view of the WCD-2 704 may be adjustable or the WCD-1 702 may transmit the request to multiple second WCDs and a second WCD (e.g., WCD-2 704) having the request field of view may respond to the request. In some examples, the indication may further include a coordinate system of the field of view. For example, the coordinate system may be a global coordinate system or other pre-configured coordinate system. Examples of global coordinate systems may include, but are not limited to LLA (Longitude, Latitude, Altitude) and ECEF (Earth-centered, Earth-fixed), also known as the Geocentric coordinate system. Thus, the request may request features within a field of view defined using a particular coordinate system. In other examples, the indication includes a differential value (e.g., +/−X degrees) with respect to a field of view of a previous set of features (e.g., keypoints) received from the WCD-2 704.

In some examples, the request may be transmitted via one or more of a unicast sidelink message, a multicast (or groupcast) sidelink message, or a broadcast sidelink message. In other examples, the request may be transmitted via a network entity (e.g., a base station or gNB in an aggregated base station architecture, or a central unit (CU), a distributed unit (DU), a radio unit (RU), a Near-Real Time (Near-RT) RAN Intelligent Controller (RIC), or a Non-Real Time (Non-RT) RIC in a disaggregated base station architecture) in wireless communication with the WCD-1 702 and WCD-2 704. For example, the request may be transmitted to the network entity via a Uu link between WCD-1 702 and the network entity and the network entity may transmit the request to the WCD-2 704 via a Uu link between the network entity and the WCD-2 704.

At 708, the WCD-2 704 may obtain a plurality of first features of a first image captured by the WCD-2 704 in a first field of view. The first field of view may be indicated in the request or may be based on the position of a sensor (e.g., camera) on the WCD-2 704 that captured the image. The WCD-2 704 may identify the plurality of first features in the first image using FAST, BRIEF, ORB, SIFT, Harris corner points or another keypoint detection algorithm. The WCD-2 704 may further determine (e.g., calculate) feature descriptors for each feature. In an example, the WCD-2 704 may obtain, at a first time instant $t_1$, an image I using its camera. The WCD-2 704 may then determine M key-point locations for image I to be $A=[(u_1, v_1), (u_2, v_2), \ldots (u_M, v_M)]$ and corresponding features $F=[F_1, F_2, \ldots F_M]$ using a keypoint detection algorithm.

At 710, the WCD-2 704 may transmit a message to the WCD-1 702 including the plurality of first features. In some examples, each of the first features may include a respective first keypoint. In other examples, each of the first features may include a respective first keypoint and corresponding first feature descriptor. The first feature descriptors may be SIFT, ORB, HOG (histogram of oriented gradients), GLOH (gradient location and orientation histogram), and/or SURF (speeded up robust features) feature descriptors. In an example, the message may include the M features for the image $\{F\}$ and the corresponding pixel locations $\{A\}$ of each of the features. In some examples, the message may further include a timestamp indicating a first time (time instant $t_1$) at which the plurality of first features were obtained.

In some examples, the message may be transmitted via one or more of a unicast sidelink message, a multicast (or groupcast) sidelink message, or a broadcast sidelink message. In other examples, the message may be transmitted via a network entity (e.g., a base station or gNB in an aggregated base station architecture, or a central unit (CU), a distributed unit (DU), a radio unit (RU), a Near-Real Time (Near-RT) RAN Intelligent Controller (RIC), or a Non-Real Time (Non-RT) RIC in a disaggregated base station architecture) in wireless communication with the WCD-1 702 and WCD-2 704. For example, the message may be transmitted to the network entity via a Uu link between WCD-2 704 and the network entity and the network entity may transmit the request to the WCD-1 702 via a Uu link between the network entity and the WCD-1 702.

At 712, the WCD-1 702 may obtain a plurality of second features of a second image captured by the WCD-1 702 in a second field of view. The second field of view and first field of view may include a common field of view. The WCD-1 702 may identify the plurality of second features in the second image using FAST, BRIEF, ORB, SIFT, Harris corner points or another keypoint detection algorithm. The WCD-1 702 may further determine (e.g., calculate) second feature descriptors for each feature. The second feature descriptors may be SIFT, ORB, HOG, GLOH, and/or SURF feature descriptors.

In an example, the WCD-1 702 may obtain, at a second time (e.g., second time instant $t_2$), an image L using its camera. The second time instant $t_2$ may be near in time to the first time instant $t_1$. For example, the second time instant $t_2$ may be within a pre-configured duration (or threshold duration) from time instant $t_1$. In examples in which the second time instant $t_2$ is outside of the pre-configured duration (e.g., the time difference between $t_2$ and $t_1$ exceeds the threshold duration), the WCD-1 702 may not use the plurality of first features and may transmit a new request for visual feature sharing to the WCD-2 704 or the WCD-1 702 may use a subsequent set of features sent by the WCD-2 704 based on the original request transmitted at 706.

At 714, the WCD-1 702 may calculate the relative pose of the WCD-1 702 with respect to the WCD-2 704 based on an association between the plurality of first features and the plurality of second features. In an example, the WCD-1 702 may use the image L obtained from its camera at time $t_2$ and match the plurality of first features F obtained from the WCD-2 704 with the plurality of second features obtained from the image L to associate the first features with the second features. For example, the first features and second features may be matched using various cross-correlation or optical flow methods and/or feature descriptors. For example, the pixel locations at which the WCD-1 702 obtains a match for N features in L can be represented as $B=[(p\_1,q\_1),(p\_2,q\_2), \ldots (p\_N,q\_N)]$. The WCD-1 702 may then determine the relative pose using an essential matrix, Nister's method, or a PnP algorithm.

In some examples, the WCD-1 702 may obtain inertial sensor information (e.g., from an IMU on the WCD-1 702) and determine mobility information of the WCD-1 702 between the first time at which the plurality of first features were obtained at the WCD-2 704 and the second time at which the plurality of second features were obtained by the WCD-1 702. The WCD-1 702 may further use the mobility information to calculate the relative pose of the WCD-1 702.

Figure 8:
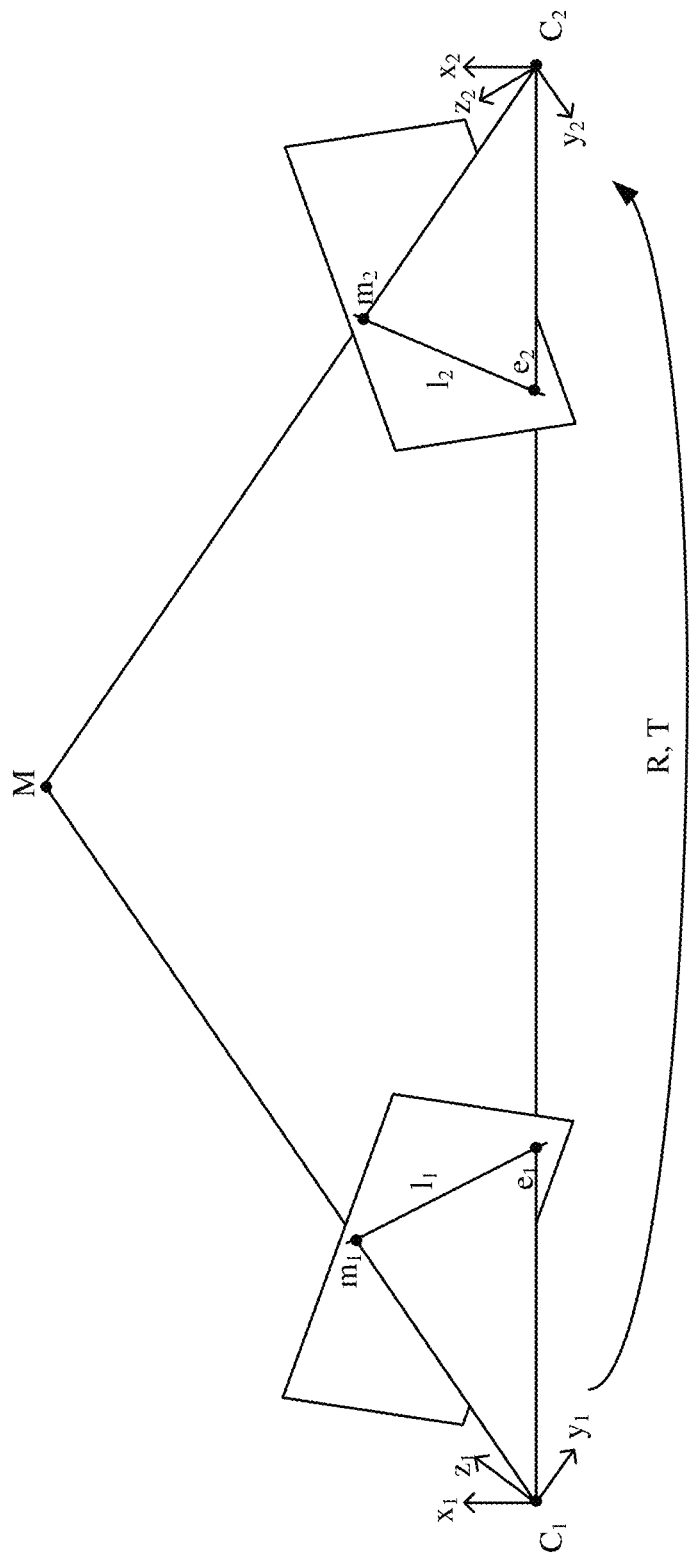
FIG. 8 is a diagram illustrating an example of relative pose determination using keypoints from images captured at different cameras according to some aspects.

FIG. 8 is a diagram illustrating an example of relative pose determination using keypoints from images captured at different cameras $C_1$ and $C_2$ according to some aspects. In the example shown in FIG. 8, each of the cameras $C_1$ and $C_2$ may be positioned on a different wireless communication device, such as a vehicle. A real point M in three-dimensional space (x, y, z) may be projected onto the respective image planes $I_1$ and $I_2$ of each of the vehicle cameras $C_1$ and $C_2$ to produce features (keypoints) $m_1$ and $m_2$. By correlating or associating (e.g., matching) multiple sets of features (e.g., corresponding to multiple real points), the epipolar constraint (e.g., line $1_1$ between $m_1$ and $e_1$ and line $1_2$ between $m_2$ and $e_2$) on the relative vehicle pose may be extracted. As a result, based on the keypoints of multiple real points and the epipolar constraint, a first wireless communication device associated with camera $C_1$ may determine the relative pose (Rotation (R), Translation (T)) of the first wireless communication device with respect to a second wireless communication device associated with camera $C_2$.

Figure 9:
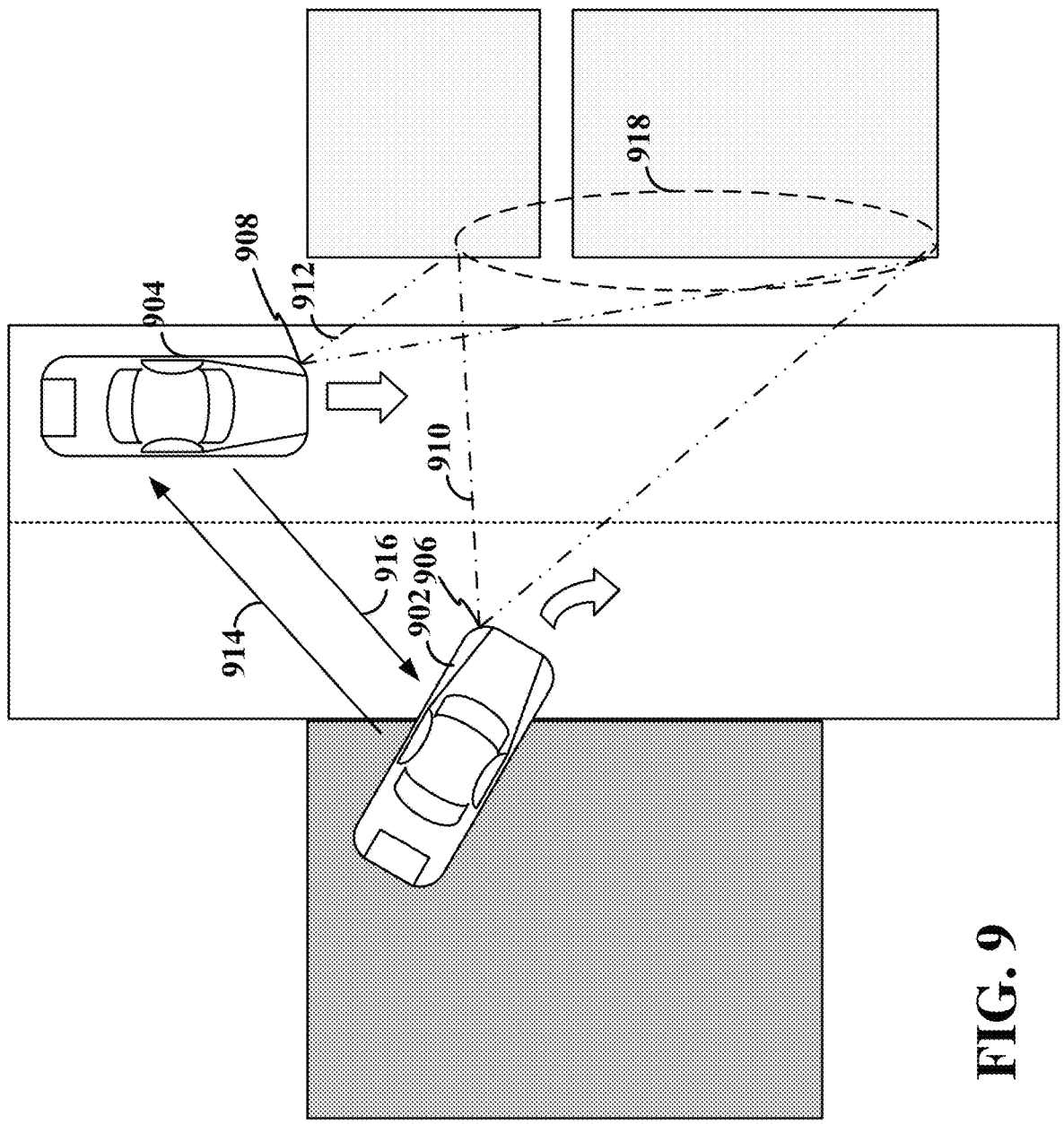
FIG. 9 is a diagram illustrating an example of global pose determination between vehicles according to some aspects.

FIG. 9 is a diagram illustrating an example of global pose determination between vehicles 902 and 904 according to some aspects. In some examples, each of the vehicles 902 and 904 may be a wireless communication device, such as a V2X device. In addition, the vehicles 902 and 904 may each be ego vehicles within an intelligent transportation system. Each of the vehicles 902 and 904 may further include a sensor (e.g., a camera) 906 and 908, respectively, for capturing images in a respective field of view 910 and 912 thereof.

In some examples, the vehicle 902 may not be aware of its global pose in a global coordinate system. For example, the vehicle 902 may have just been turned on and not yet acquired its Global Positioning System (GPS) coordinates. In this example, the vehicle 902 may transmit a request 914 for visual feature sharing to nearby vehicles (e.g., vehicle 904). The request 914 may further include a request for a global pose of the vehicle 904. In response to receiving the request 914, the vehicle 904 may capture an image (e.g., a first image) within the field of view 912 of the on-board camera 908 of the vehicle 904 and identify a plurality of keypoints in the image using FAST, ORB, BRIEF, SIFT, Harris corner points or another keypoint detection algorithm. In addition, the vehicle 904 may obtain (e.g., retrieve from memory) the global pose of the vehicle 904 within a global coordinate system (e.g., LLA or ECEF) or other pre-configured or specified coordinate system. For example, the vehicle 904 may include a navigation system (e.g., global navigation satellite system (GNSS) receiver) or GPS receiver that may be configured to determine the global pose of the vehicle 904 within a global coordinate system.

The vehicle 904 may then transmit a message 916 to the vehicle 902 including the identified features (keypoints), along with the global pose (e.g., a first global pose) of the vehicle 904. The vehicle 902 may then capture an image (e.g., a second image) within the field of view 910 of the on-board camera 906 of the vehicle 902 and identify a plurality of keypoints in the image using FAST, ORB, BRIEF, SIFT, Harris corner points or other keypoint detection algorithm. The field of views 910 and 912 of the respective cameras 906 and 908 include a common area 918 within which common features may be identified by the vehicles 902 and 904. Thus, the vehicle 902 may calculate the relative pose of the vehicle 902 with respect to the vehicle 904 based on an association between the common features. For example, the vehicle 902 may calculate the relative pose using an essential matrix, Nister's method, or a PnP algorithm.

The vehicle 902 may further calculate the global pose (e.g., a second global pose) of the vehicle 902 based on the relative pose between the vehicles 902 and 904 and the first global pose of the vehicle 904. In examples in which the first global pose of the vehicle 904 is based on a vehicle frame of reference (e.g., center axle or other part of the vehicle body frame) instead of the camera frame of reference, the vehicle 904 may further calculate an additional relative pose of the camera 908 with respect to a reference frame associated with the vehicle 904. For example, the reference frame may correspond to the vehicle body frame of the vehicle 904 on which the camera 908 is mounted. The message 916 may further include the additional relative pose, and the vehicle 902 may calculate the second global pose (e.g., the global pose of the vehicle 902) further based on the additional relative pose.

Figure 10:
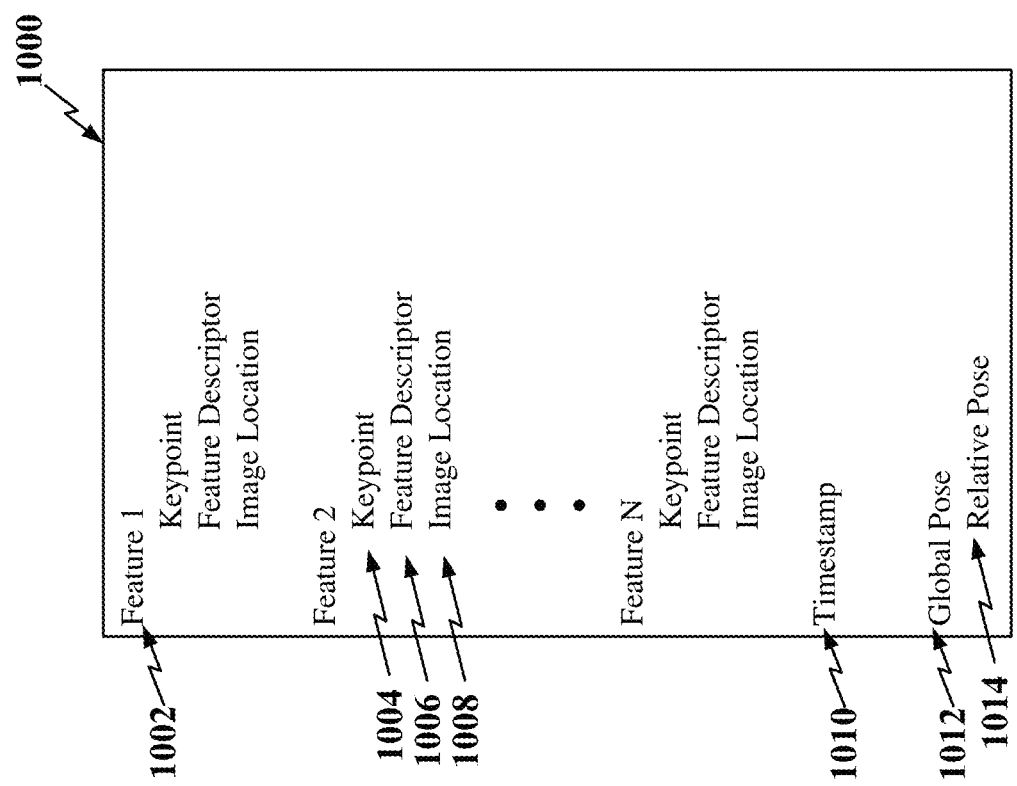
FIG. 10 is a diagram illustrating an example of a message including visual feature sharing information according to some aspects.

FIG. 10 is a diagram illustrating an example of a message 1000 including visual feature sharing information according to some aspects. In the example shown in FIG. 10, the message 1000 includes a plurality of features 1002 within an image captured by the wireless communication device sending the message 1000. For each feature 1002, the message 1000 may include a keypoint 1004 (e.g., an identification of the keypoint), and in some examples, may further include a feature descriptor 1006. The message 1000 may further include a respective location (e.g., pixel location) 1008 in the image of each of the features 1002. In some examples, the message 1000 may further include a timestamp 1010 at which the features 1002 were obtained. In addition, the message 1000 may optionally include a global pose 1012 of the wireless communication device sending the message 1000. In examples in which the global pose 1012 is associated with a different frame of reference than the camera, the message 1000 may further include a relative pose 1014 of the camera with respect to a reference frame of the wireless communication device sending the message 1000.

In some examples, the message 1000 may be transmitted during a sidelink ranging operation. Within a sidelink communication network, such as a V2X network, positioning of UEs may enhance or support various features, such as navigation, autonomous driving, and cooperative safety. Positioning of UEs may be accomplished, for example, using a global navigation satellite system (GNSS) receiver within the UE and/or via sidelink-based ranging between UEs. For example, UEs may exchange positioning reference signals (PRSs) over sidelinks to determine the relative distance between the UEs and/or the absolute position (e.g., geographical coordinates) of the UEs. Sidelink ranging operations may enhance the range and position accuracy of GNSS-based positioning or may be utilized in situations where GNSS is degraded or unavailable.

Figure 11:
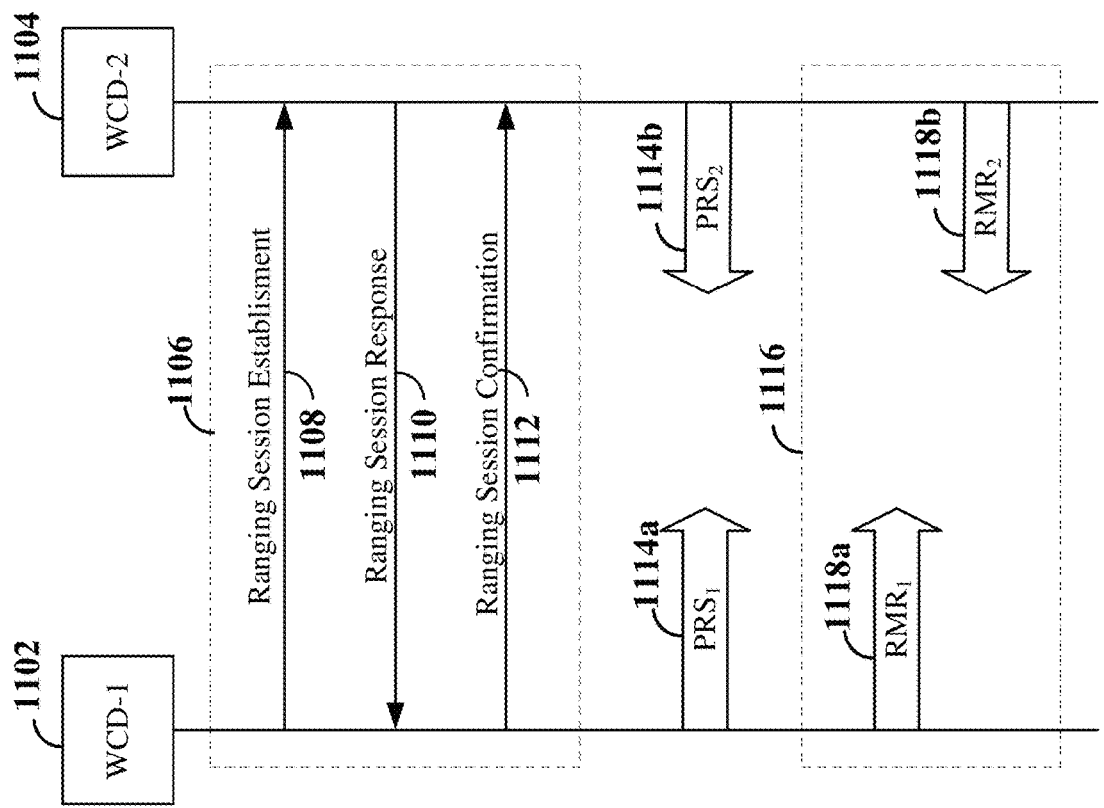
FIG. 11 is a diagram illustrating an example of a sidelink ranging operation between wireless communication devices according to some aspects.

FIG. 11 is a diagram illustrating an example of a sidelink ranging operation between wireless communication devices (WCD-1 1102 and WCD-2 1104) according to some aspects. Each of the WCD-1 1102 and the WCD-2 1104 may be, for example, a vehicle (e.g., an ego vehicle), a UE, a V2X device, or a sidelink device. The WCD-1 1102 and the WCD-2 1104 may be in the vicinity of one another. In some examples, the WCD-1 1102 and WCD-2 1104 may have established a sidelink therebetween (e.g., via discovery signals).

At 1106, a sidelink ranging session may be established using a three-way messaging handshake technique. For example, at 1108, the WCD-1 1102 may transmit a sidelink ranging session establishment message to one or more target WCDs (e.g., WCD-2 1104) in the vicinity of the WCD-1 1102. In one example, the request can be signaled at the application layer, enabling a radio access technology (RAT)-independent technique for session establishment. In other examples, the request can be signaled at the physical layer (e.g., within SCI-2) or the medium access control (MAC) layer.

In response to receiving the sidelink ranging session establishment message, at 1110, the WCD-2 1104 may transmit a sidelink ranging session response message to the WCD-1 1102 to join the sidelink ranging session. Then, at 1112, the WCD-1 1102 may transmit a sidelink ranging session confirmation message to the WCD-2 1104 to confirm the establishment of the sidelink ranging session.

In some examples, the WCD-1 1102 may further include a request for visual feature sharing within the sidelink ranging establishment message at 1106 and/or within the sidelink ranging session configuration message at 1112. In other examples, the WCD-1 1102 may transmit the request for visual feature sharing after the handshake messaging at 1106.

At 1114, each of the WCD-1 1102 and WCD-2 1104 may transmit a respective PRS. For example, at 1114*a*, the WCD-1 1102 may transmit a PRS ($PRS_1$) and at 1114*b* the WCD-2 1104 may transmit a PRS ($PRS_2$). The PRSs may be transmitted, for example, in accordance with PRS resources indicated in the sidelink ranging session establishment message. In some examples, the PRSs may be wideband PRSs transmitted across a particular frequency band or sub-band.

At 1116, each of WCDs may exchange ranging measurement reports obtained based on the PRSs. For example, at 1118*a*, the WCD-1 1102 may transmit a ranging measurement report ($RMR_1$) obtained by the WCD-1 1102 based on the received PRS from the WCD-2 1104. Similarly, at 1118*b*, the WCD-2 1104 may transmit a ranging measurement report ($RMR_2$) to the WCD-1 1102. In some examples, the RMRs may be transmitted within respective SCI-2, respective sidelink MAC-CEs or via other unicast or broadcast sidelink messages.

Each of the RMRs may include a respective inter-WCD round-trip-time (RTT) calculated based on the PRSs. For example, the WCD-1 1102 may calculate the RTT between the WCD-1 1102 and the WCD-2 1104 based on the transmit and receive times of $PRS_2$. Similarly, the WCD-2 1104 may calculate the RTT between the WCD-2 1104 and the WCD-1 1102 based on the transmit and receive times of $PRS_1$. The RMRs may further include a location (e.g., geographical coordinates) of the respective WCD, if known. Based on the RMR received from WCD-2 1104, the WCD-1 1102 may discern its relative position or absolute position (e.g., geographical coordinates).

In some examples, the RMR 1118*b* sent from the WCD-2 1104 to the WCD-1 1102 may further include a plurality of features (e.g., keypoints and corresponding feature descriptors, if available) of an image captured by the WCD-2 1104. The WCD-1 1102 may further use the features included in the RMR 1118*b* to calculate the relative pose of the WCD-1 1102 with respect to the WCD-2 1104.

Figure 12:
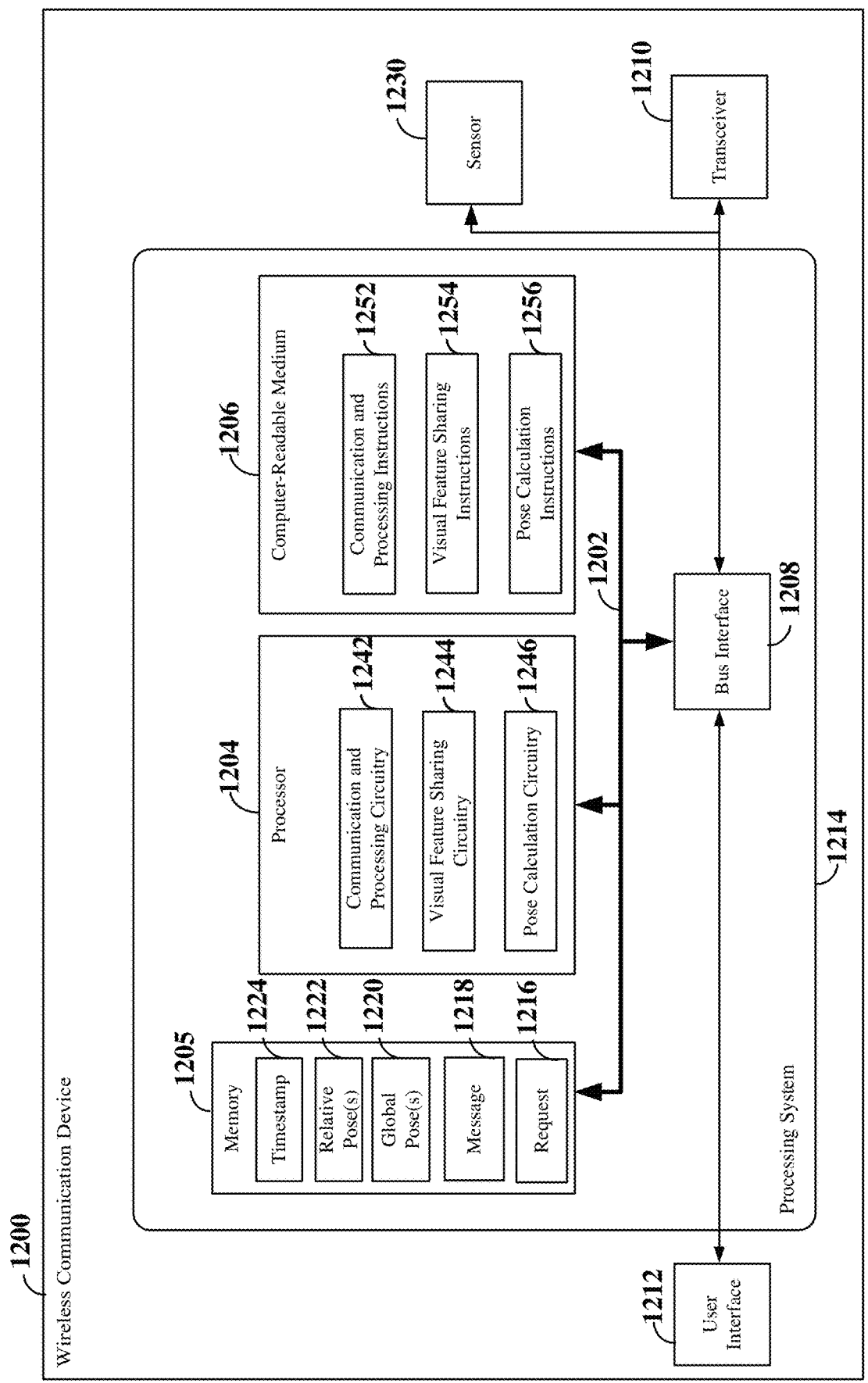
FIG. 12 is a block diagram illustrating an example of a hardware implementation for a wireless communication device employing a processing system according to some aspects.

FIG. 12 is a block diagram illustrating an example of a hardware implementation for a wireless communication device 1200 employing a processing system 1214. For example, the wireless communication 1200 may correspond to a sidelink device, such as a vehicle or other V2X device, as shown and described above in reference to FIGS. 1, 3, 6, 7, and/or 9.

The wireless communication device 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1200 may be configured to perform any one or more of the functions described herein. That is, the processor 1204, as utilized in the wireless communication device 1200, may be used to implement any one or more of the processes and procedures described below.

The processor 1204 may in some instances be implemented via a baseband or modem chip and in other implementations, the processor 1204 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 links together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further.

A bus interface 1208 provides an interface between the bus 1202 and a transceiver 1210. The transceiver 1210 provides a communication interface or a means for communicating with various other apparatus over a transmission medium (e.g., air interface). Depending upon the nature of the apparatus, a user interface 1212 (e.g., keypad, display, touch screen, speaker, microphone, control knobs, etc.) may also be provided. Of course, such a user interface 1212 is optional, and may be omitted in some examples. In addition, the bus interface 1208 may further provide an interface between the bus 1202 and a sensor 1230, such as a camera.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software. For example, the memory 1205 may store one or more of a request 1216 for visual feature sharing, a message 1218 including a plurality of features of an image, one or more global poses 1220, one or more relative poses 1222, and/or a timestamp 1224, which may be used by the processor 1204 in visual feature sharing applications.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206.

The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. In some examples, the computer-readable medium 1206 may be part of the memory 1205. Those skilled in the art will recognize how best to implement the described functionality presented throughout this disclosure depending on the particular application and the overall design constraints imposed on the overall system. In some examples, the computer-readable medium 1206 may be implemented on an article of manufacture, which may further include one or more other elements or circuits, such as the processor 1204 and/or memory 1205.

In some aspects of the disclosure, the processor 1204 may include circuitry configured for various functions. For example, the processor 1204 may include communication and processing circuitry 1242, configured to communicate with one or more sidelink devices (e.g., other wireless communication devices) via respective sidelinks (e.g., PC5 interfaces). In addition, the communication and processing circuitry 1242 may be configured to communicate with a network entity (e.g., a base station, such as a gNB or eNB) via a Uu link. In some examples, the communication and processing circuitry 1242 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1242 may include one or more transmit/receive chains.

In some implementations where the communication involves receiving information, the communication and processing circuitry 1242 may obtain information from a component of the wireless communication device 1200 (e.g., from the transceiver 1210 that receives the information via radio frequency signaling or some other type of signaling suitable for the applicable communication medium), process (e.g., decode) the information, and output the processed information. For example, the communication and processing circuitry 1242 may output the information to another component of the processor 1204, to the memory 1205, or to the bus interface 1208. In some examples, the communication and processing circuitry 1242 may receive one or more of signals, messages, other information, or any combination thereof. In some examples, the communication and processing circuitry 1242 may receive information via one or more channels. In some examples, the communication and processing circuitry 1242 may include functionality for a means for receiving. In some examples, the communication and processing circuitry 1242 may include functionality for a means for processing, including a means for demodulating, a means for decoding, etc.

In some implementations where the communication involves sending (e.g., transmitting) information, the communication and processing circuitry 1242 may obtain information (e.g., from another component of the processor 1204, the memory 1205, or the bus interface 1208), process (e.g., modulate, encode, etc.) the information, and output the processed information. For example, the communication and processing circuitry 1242 may output the information to the transceiver 1210 (e.g., that transmits the information via radio frequency signaling or some other type of signaling suitable for the applicable communication medium). In some examples, the communication and processing circuitry 1242 may send one or more of signals, messages, other information, or any combination thereof. In some examples, the communication and processing circuitry 1242 may send information via one or more channels. In some examples, the communication and processing circuitry 1242 may include functionality for a means for sending (e.g., a means for transmitting). In some examples, the communication and processing circuitry 1242 may include functionality for a means for generating, including a means for modulating, a means for encoding, etc.

In some examples, the communication and processing circuitry 1242 may be configured to transmit, via the transceiver 1210, a request 1216 for visual feature sharing to another wireless communication device. In other examples, the communication and processing circuitry 1242 may be configured to receive a request 1216 for visual feature sharing from another wireless communication device. In some examples, the request 1216 may be at least one of a unicast sidelink message, a multicast sidelink message, or a broadcast sidelink message. In other examples, the communication and processing circuitry 1242 may be configured to transmit or receive the request 1216 via a network entity in wireless communication with the wireless communication device 1200 and the other wireless communication device.

The communication and processing circuitry 1242 may further be configured to receive, via the transceiver 1210, a message 1218 from another wireless communication device including a plurality of features of an image captured by the other wireless communication device. In other examples, the communication and processing circuitry 1242 may be configured to transmit a message 1218 including a plurality of features of an image captured by the camera 1230 of the wireless communication device 1200 to the other wireless communication device. In some examples, each feature may include a keypoint, and may optionally further include a respective feature descriptor corresponding to the keypoint. In some examples, the message 1218 may be at least one of a unicast sidelink message, a multicast sidelink message, or a broadcast sidelink message. In other examples, the communication and processing circuitry 1242 may be configured to transmit or receive the message 1218 via a network entity in wireless communication with the wireless communication device 1200 and the other wireless communication device. The communication and processing circuitry 1242 may further be configured to execute communication and processing instructions (software) 1252 stored in the computer-readable medium 1206 to implement one or more of the functions described herein.

The processor 1204 may further include visual feature sharing circuitry 1244, configured to generate and/or process the request 1216 for visual feature sharing. The visual feature sharing circuitry 1244 may further be configured to generate and/or process the message 1218 including a plurality of features.

In some examples, the visual feature sharing circuitry 1244 may generate the request 1216 including an indication of a field of view to be used by the other wireless communication device in capturing an image. In some examples, the indication includes a coordinate system of the field of view. In other examples, the indication includes a differential value with respect to a previous set of features received from the other wireless communication device. In some examples, the visual feature sharing circuitry 1244 may operate together with the communication and processing circuitry 1242 to perform a sidelink ranging operation between the wireless communication device 1200 and the other wireless communication device. In this example, the visual feature sharing circuitry 1244 may be configured to generate and transmit the request 1216 for visual feature sharing during the sidelink ranging operation.

In some examples, the visual feature sharing circuitry 1244 may generate the message 1218 in response to receiving the request 1216. In this example, the visual feature sharing circuitry 1244 may be configured to obtain a plurality of features of an image captured by the sensor (e.g., camera) 1230 and to include the plurality of features within the message 1218. In some examples, each feature in the plurality of features includes a respective keypoint of the image. In some examples, each feature in the plurality of features further includes a respective feature descriptor corresponding to the respective keypoint. In some examples, the visual feature sharing circuitry 1244 may further be configured to obtain a respective set of features for each of a plurality of images captured by the sensor 1230 and include each respective set of features within the message 1218. In some examples, the visual feature sharing circuitry 1244 may be configured to obtain a timestamp 1224 indicating a time at which the plurality of features were obtained and to include the timestamp 1224 in the message 1218.

The visual feature sharing circuitry 1244 may further be configured to determine the global pose 1220 or retrieve the global pose 1220 from memory 1205 and to include the global pose 1220 in the message 1218. In examples in which the frame of reference of the global pose 1220 is different than the sensor (e.g., camera) 1230, the visual feature sharing circuitry 1244 may further be configured to calculate a relative pose (e.g., relative pose 1222) of the sensor 1230 with respect to a reference frame associated with the wireless communication device 1200. In some examples, the reference frame corresponding to a vehicle body frame of a vehicle (e.g., wireless communication device 1200) on which the sensor 1230 is mounted.

In examples in which the request 1216 is received during a sidelink ranging operation, the visual feature sharing circuitry 1244 may further transmit the message 1218 within a sidelink ranging measurement report. The visual feature sharing circuitry 1244 may further be configured to execute visual feature sharing instructions (software) 1254 stored in the computer-readable medium 1206 to implement one or more of the functions described herein.

The processor 1204 may further include pose calculation circuitry 1246, configured to calculate the relative pose (e.g., relative pose 1222) between the wireless communication device and another wireless communication device. In some examples, the visual feature sharing circuitry 1244 may be configured to receive a plurality of first features in a first field of view within a message 1218 from another (e.g., a second) wireless communication device. In this example, the pose calculation circuitry 1246 may be configured to obtain a plurality of second features in a second field of view associated with the wireless communication device 1200. Each of the plurality of second features may include a respective second keypoint of an image captured by the sensor 1230 of the wireless communication device 1200. The pose calculation circuitry 1246 may then calculate the relative pose 1222 of the wireless communication device 1200 with respect to the other wireless communication device based on an association between the plurality of first features and the plurality of second features.

In some examples, each of the first features may include a respective first feature descriptor corresponding to the respective first keypoint and each of the second features may include a respective second feature descriptor corresponding to the respective second keypoint. In this example, the pose calculation circuitry 1246 may further be configured to associate the plurality of first features with the plurality of second features based on the first keypoints, the second keypoints, the first feature descriptors, and the second feature descriptors.

In some examples, the message 1218 may further include a first global pose 1220 of the other wireless communication device in a coordinate system. In this example, the pose calculation circuitry 1246 may further be configured to calculate a second global pose 1220 of the wireless communication device 1200 in the coordinate system based on the first global pose 1220 and the relative pose 1222 of the wireless communication device 1200 with respect to the other wireless communication device. In examples in which the message 1218 further includes an additional relative pose 1222 of a sensor (e.g., camera) on the other wireless communication device with respect to a reference frame (e.g., a vehicle body frame) associated with other wireless communication device, the pose calculation circuitry 1246 may further be configured to calculate the second global pose 1220 further based on the additional relative pose 1222.

In some examples, the message 1218 may further include a timestamp 1224 indicating a first time at which the plurality of first features were obtained at the other wireless communication device. In this example, the pose calculation circuitry 1246 may further be configured to determine mobility information of the wireless communication device 1200 between the first time and a second time at which the plurality of second features were obtained at the wireless communication device 1200. The pose calculation circuitry 1246 may further be configured to calculate the relative pose 1222 of the wireless communication device 1200 with respect to the other wireless communication device further based on the mobility information. The pose calculation circuitry 1246 may further be configured to execute pose calculation instructions (software) 1256 stored in the computer-readable medium 1206 to implement one or more of the functions described herein.

Figure 13:
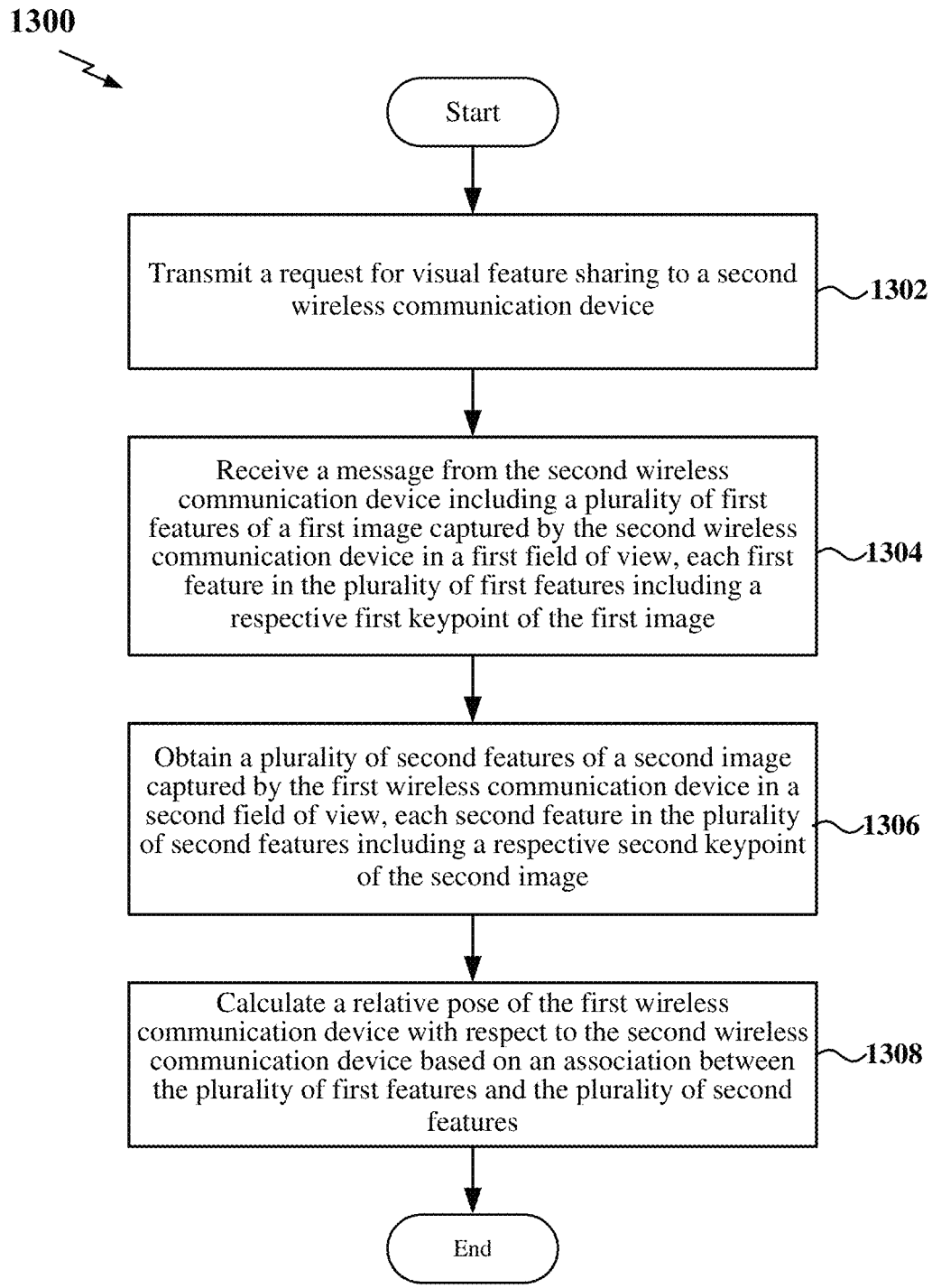
FIG. 13 is a flow chart of an exemplary process for relative pose determination according to some aspects.

FIG. 13 is a flow chart of an exemplary process 1300 for relative pose determination according to some aspects. As described below, some or all illustrated features may be omitted in a particular implementation within the scope of the present disclosure, and some illustrated features may not be required for implementation of all examples. In some examples, the method may be performed by the wireless communication device 1200, as described above and illustrated in FIG. 12, by a processor or processing system, or by any suitable means for carrying out the described functions.

At block 1302, the wireless communication device (e.g., a first wireless communication device) may transmit a request for visual feature sharing to a second wireless communication device. In some examples, the request may include an indication of a first field of view. In some examples, the indication may include a coordinate system of the first field of view. In other examples, the indication may include a differential value with respect to a previous set of features received from the second wireless communication device. For example, the communication and processing circuitry 1242, together with the visual feature sharing circuitry 1244 and transceiver 1210, shown and described above in connection with FIG. 12, may provide a means to transmit the request.

At block 1304, the first wireless communication device may receive a message from the second wireless communication device. The message can include a plurality of first features of a first image captured by the second wireless communication device in a first field of view. Each first feature in the plurality of first features may include a respective first keypoint of the first image. In some examples, the message includes at least one of a unicast sidelink message, a multicast sidelink message, or a broadcast sidelink message. In some examples, the first wireless communication device may receive the message from the second wireless communication device via a network entity in wireless communication with the first wireless communication device and the second wireless communication device. The communication and processing circuitry 1242, together with the visual feature sharing circuitry 1244 and transceiver 1210, shown and described above in connection with FIG. 12, may provide a means to receive the message.

At block 1306, the first wireless communication device may obtain a plurality of second features of a second image captured by the first wireless communication device in a second field of view. Each second feature in the plurality of second features may include a respective second keypoint of the second image. The pose calculation circuitry 1246, together with the sensor 1230, shown and described above in connection with FIG. 12, may provide a means to obtain the plurality of second features.

At block 1308, the first wireless communication device may calculate a relative pose of the first wireless communication device with respect to the second wireless communication device based on an association between the plurality of first features and the plurality of second features. In some examples, each first feature in the plurality of first features further comprises a respective first feature descriptor corresponding to the respective first keypoint, and each second feature in the plurality of second features further comprises a respective second feature descriptor corresponding to the respective second keypoint. In this example, the first wireless communication device may associate the plurality of first features with the plurality of second features based on the first keypoints, the second keypoints, the first feature descriptors, and the second feature descriptors. The pose calculation circuitry 1246 shown and described above in connection with FIG. 12, may provide a means to calculate the relative pose.

Figure 14:
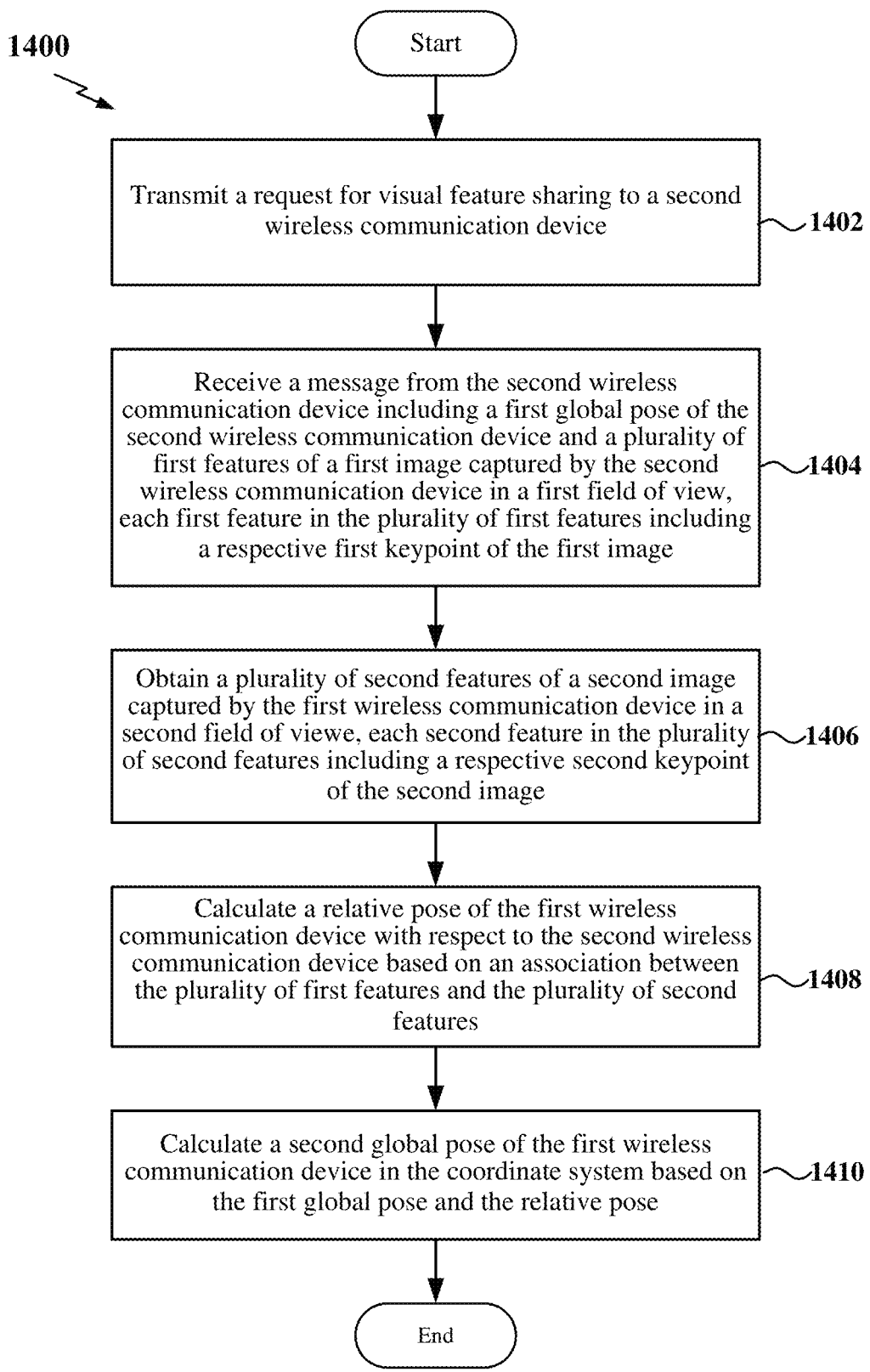
FIG. 14 is a flow chart of another exemplary process for relative pose determination according to some aspects.

FIG. 14 is a flow chart of another exemplary process 1400 for relative pose determination according to some aspects. As described below, some or all illustrated features may be omitted in a particular implementation within the scope of the present disclosure, and some illustrated features may not be required for implementation of all examples. In some examples, the method may be performed by the wireless communication device 1200, as described above and illustrated in FIG. 12, by a processor or processing system, or by any suitable means for carrying out the described functions.

At block 1402, the wireless communication device (e.g., a first wireless communication device) may transmit a request for visual feature sharing to a second wireless communication device. In some examples, the request may include an indication of a first field of view. In some examples, the indication may include a coordinate system of the first field of view. In other examples, the indication may include a differential value with respect to a previous set of features received from the second wireless communication device. For example, the communication and processing circuitry 1242, together with the visual feature sharing circuitry 1244 and transceiver 1210, shown and described above in connection with FIG. 12, may provide a means to transmit the request.

At block 1404, the first wireless communication device may receive a message from the second wireless communication device. The message can include a first global pose of the second wireless communication device and a plurality of first features of a first image captured by the second wireless communication device in a first field of view. Each first feature in the plurality of first features may include a respective first keypoint of the first image. In some examples, the message includes at least one of a unicast sidelink message, a multicast sidelink message, or a broadcast sidelink message. In some examples, the first wireless communication device may receive the message from the second wireless communication device via a network entity in wireless communication with the first wireless communication device and the second wireless communication device. The communication and processing circuitry 1242, together with the visual feature sharing circuitry 1244 and transceiver 1210, shown and described above in connection with FIG. 12, may provide a means to receive the message.

At block 1406, the first wireless communication device may obtain a plurality of second features of a second image captured by the first wireless communication device in a second field of view. Each second feature in the plurality of second features may include a respective second keypoint of the second image. The pose calculation circuitry 1246, together with the sensor 1230, shown and described above in connection with FIG. 12, may provide a means to obtain the plurality of second features.

At block 1408, the first wireless communication device may calculate a relative pose of the first wireless communication device with respect to the second wireless communication device based on an association between the plurality of first features and the plurality of second features. In some examples, each first feature in the plurality of first features further comprises a respective first feature descriptor corresponding to the respective first keypoint, and each second feature in the plurality of second features further comprises a respective second feature descriptor corresponding to the respective second keypoint. In this example, the first wireless communication device may associate the plurality of first features with the plurality of second features based on the first keypoints, the second keypoints, the first feature descriptors, and the second feature descriptors. The pose calculation circuitry 1246 shown and described above in connection with FIG. 12, may provide a means to calculate the relative pose.

At 1410, the first wireless communication device may calculate a second global pose of the first wireless communication device in the coordinate system based on the first global pose and the relative pose. In some examples, the message may further include an additional relative pose of a sensor on the second wireless communication device with respect to a reference frame associated with the second wireless communication device. For example, the reference frame may correspond to a vehicle body frame associated with the second wireless communication device. In this example, the first wireless communication device may calculate the second global pose further based on the additional relative pose. The pose calculation circuitry 1246 shown and described above in connection with FIG. 12, may provide a means to calculate the second global pose.

Figure 15:
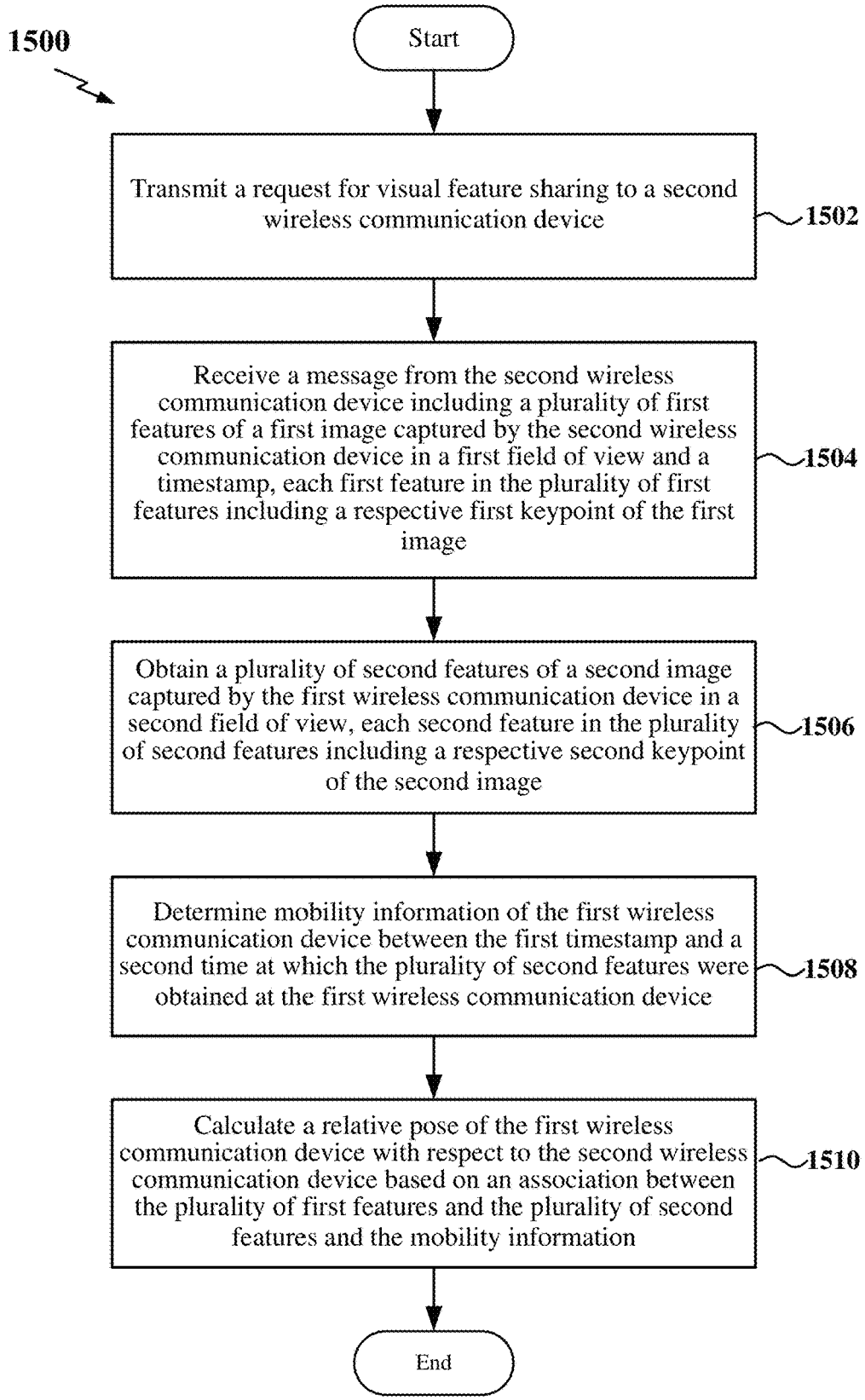
FIG. 15 is a flow chart of another exemplary process for relative pose determination according to some aspects.

FIG. 15 is a flow chart of another exemplary process 1500 for relative pose determination according to some aspects. As described below, some or all illustrated features may be omitted in a particular implementation within the scope of the present disclosure, and some illustrated features may not be required for implementation of all examples. In some examples, the method may be performed by the wireless communication device 1200, as described above and illustrated in FIG. 12, by a processor or processing system, or by any suitable means for carrying out the described functions.

At block 1502, the wireless communication device (e.g., a first wireless communication device) may transmit a request for visual feature sharing to a second wireless communication device. In some examples, the request may include an indication of a first field of view. In some examples, the indication may include a coordinate system of the first field of view. In other examples, the indication may include a differential value with respect to a previous set of features received from the second wireless communication device. For example, the communication and processing circuitry 1242, together with the visual feature sharing circuitry 1244 and transceiver 1210, shown and described above in connection with FIG. 12, may provide a means to transmit the request.

At block 1504, the first wireless communication device may receive a message from the second wireless communication device. The message can include a plurality of first features of a first image captured by the second wireless communication device in a first field of view and a timestamp indicating a first time at which the plurality of first features were obtained at the second wireless communication device. Each first feature in the plurality of first features may include a respective first keypoint of the first image. In some examples, the message includes at least one of a unicast sidelink message, a multicast sidelink message, or a broadcast sidelink message. In some examples, the first wireless communication device may receive the message from the second wireless communication device via a network entity in wireless communication with the first wireless communication device and the second wireless communication device. The communication and processing circuitry 1242, together with the visual feature sharing circuitry 1244 and transceiver 1210, shown and described above in connection with FIG. 12, may provide a means to receive the message.

At block 1506, the first wireless communication device may obtain a plurality of second features of a second image captured by the first wireless communication device in a second field of view. Each second feature in the plurality of second features may include a respective second keypoint of the second image. The pose calculation circuitry 1246, together with the sensor 1230, shown and described above in connection with FIG. 12, may provide a means to obtain the plurality of second features.

At block 1508, the first wireless communication device may determine mobility information of the first wireless communication device between the first time and a second time at which the plurality of second features were obtained at the first wireless communication device. For example, the pose calculation circuitry 1246 shown and described above in connection with FIG. 12 may determine the mobility information.

At block 1510, the first wireless communication device may calculate a relative pose of the first wireless communication device with respect to the second wireless communication device based on an association between the plurality of first features and the plurality of second features and the mobility information. In some examples, each first feature in the plurality of first features further comprises a respective first feature descriptor corresponding to the respective first keypoint, and each second feature in the plurality of second features further comprises a respective second feature descriptor corresponding to the respective second keypoint. In this example, the first wireless communication device may associate the plurality of first features with the plurality of second features based on the first keypoints, the second keypoints, the first feature descriptors, and the second feature descriptors. The pose calculation circuitry 1246 shown and described above in connection with FIG. 12, may provide a means to calculate the relative pose.

Figure 16:
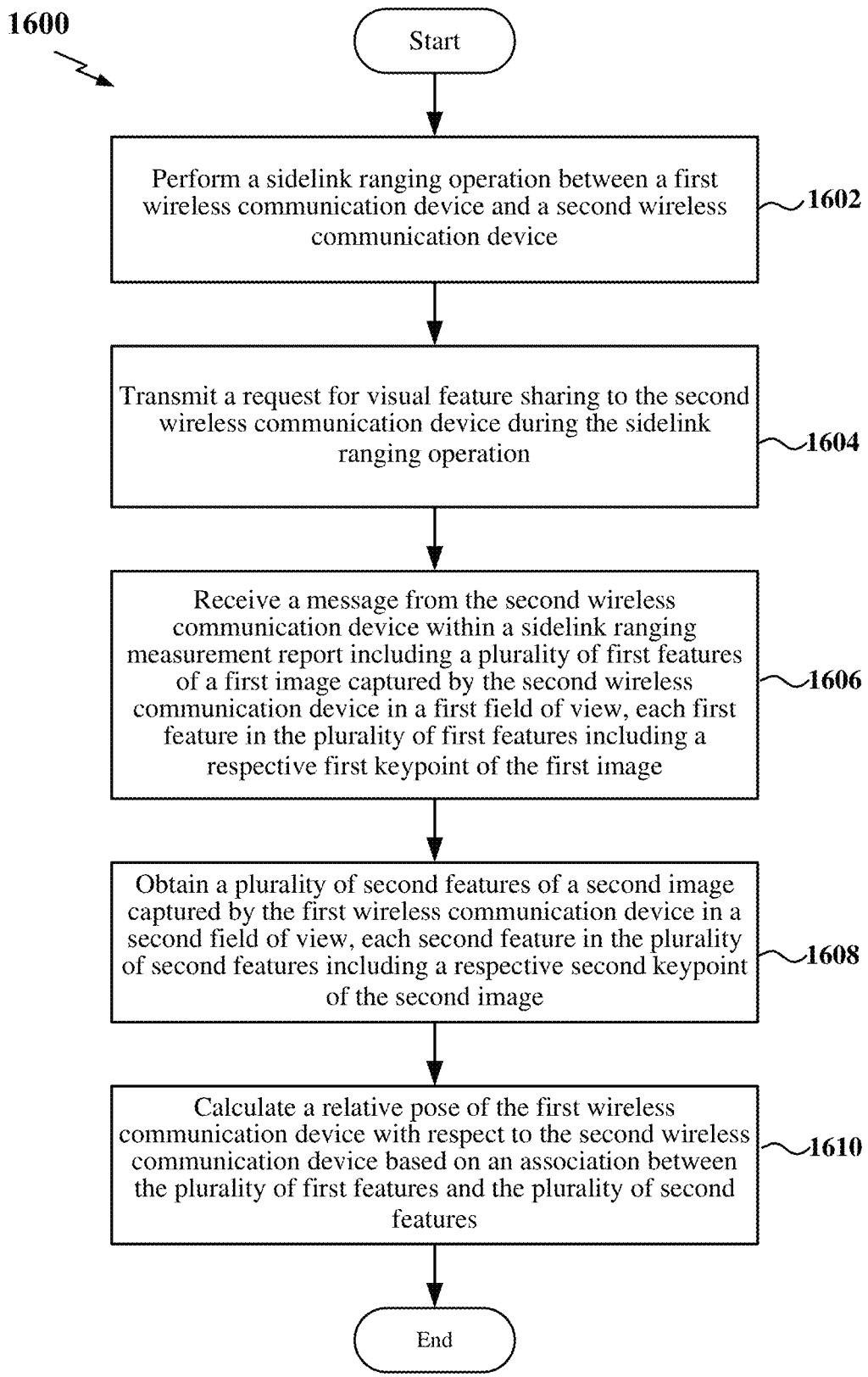
FIG. 16 is a flow chart of another exemplary process for relative pose determination according to some aspects.

FIG. 16 is a flow chart of another exemplary process 1600 for relative pose determination according to some aspects. As described below, some or all illustrated features may be omitted in a particular implementation within the scope of the present disclosure, and some illustrated features may not be required for implementation of all examples. In some examples, the method may be performed by the wireless communication device 1200, as described above and illustrated in FIG. 12, by a processor or processing system, or by any suitable means for carrying out the described functions.

At block 1602, the wireless communication device (e.g., a first wireless communication device) may perform a sidelink ranging operation between the first wireless communication device and a second wireless communication device. For example, the communication and processing circuitry 1242, together with the visual feature sharing circuitry 1244 and transceiver 1210, shown and described above in connection with FIG. 12, may provide a means to perform the sidelink ranging operation.

At block 1604, the first wireless communication device may transmit a request for visual feature sharing to the second wireless communication device during the sidelink ranging operation. In some examples, the request may include an indication of a first field of view. In some examples, the indication may include a coordinate system of the first field of view. In other examples, the indication may include a differential value with respect to a previous set of features received from the second wireless communication device. For example, the communication and processing circuitry 1242, together with the visual feature sharing circuitry 1244 and transceiver 1210, shown and described above in connection with FIG. 12, may provide a means to transmit the request.

At block 1606, the first wireless communication device may receive a message from the second wireless communication device within a sidelink ranging measurement report. The message can include a plurality of first features of a first image captured by the second wireless communication device in a first field of view. Each first feature in the plurality of first features may include a respective first keypoint of the first image. The communication and processing circuitry 1242, together with the visual feature sharing circuitry 1244 and transceiver 1210, shown and described above in connection with FIG. 12, may provide a means to receive the message.

At block 1608, the first wireless communication device may obtain a plurality of second features of a second image captured by the first wireless communication device in a second field of view. Each second feature in the plurality of second features may include a respective second keypoint of the second image. The pose calculation circuitry 1246, together with the sensor 1230, shown and described above in connection with FIG. 12, may provide a means to obtain the plurality of second features.

At block 1610, the first wireless communication device may calculate a relative pose of the first wireless communication device with respect to the second wireless communication device based on an association between the plurality of first features and the plurality of second features. In some examples, each first feature in the plurality of first features further comprises a respective first feature descriptor corresponding to the respective first keypoint, and each second feature in the plurality of second features further comprises a respective second feature descriptor corresponding to the respective second keypoint. In this example, the first wireless communication device may associate the plurality of first features with the plurality of second features based on the first keypoints, the second keypoints, the first feature descriptors, and the second feature descriptors. The pose calculation circuitry 1246 shown and described above in connection with FIG. 12, may provide a means to calculate the relative pose.

In one configuration, the wireless communication device 1200 includes means for transmitting a request for visual feature sharing to a second wireless communication device and means for receiving a message from the second wireless communication device, where the message includes a plurality of first features of a first image captured by the second wireless communication device in a first field of view and each first feature in the plurality of first features includes a respective first keypoint of the first image. The wireless communication device further includes means for obtaining a plurality of second features of a second image captured by the first wireless communication device in a second field of view, where each second feature in the plurality of second features includes a respective second keypoint of the second image, and means for calculating a relative pose of the first wireless communication device with respect to the second wireless communication device based on an association between the plurality of first features and the plurality of second features. In one aspect, the aforementioned means may be the processor 1204 shown in FIG. 12 configured to perform the functions recited by the aforementioned means. In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1, 3, 7, and/or 11, and utilizing, for example, the processes and/or algorithms described herein in relation to FIGS. 13-16.

Figure 17:
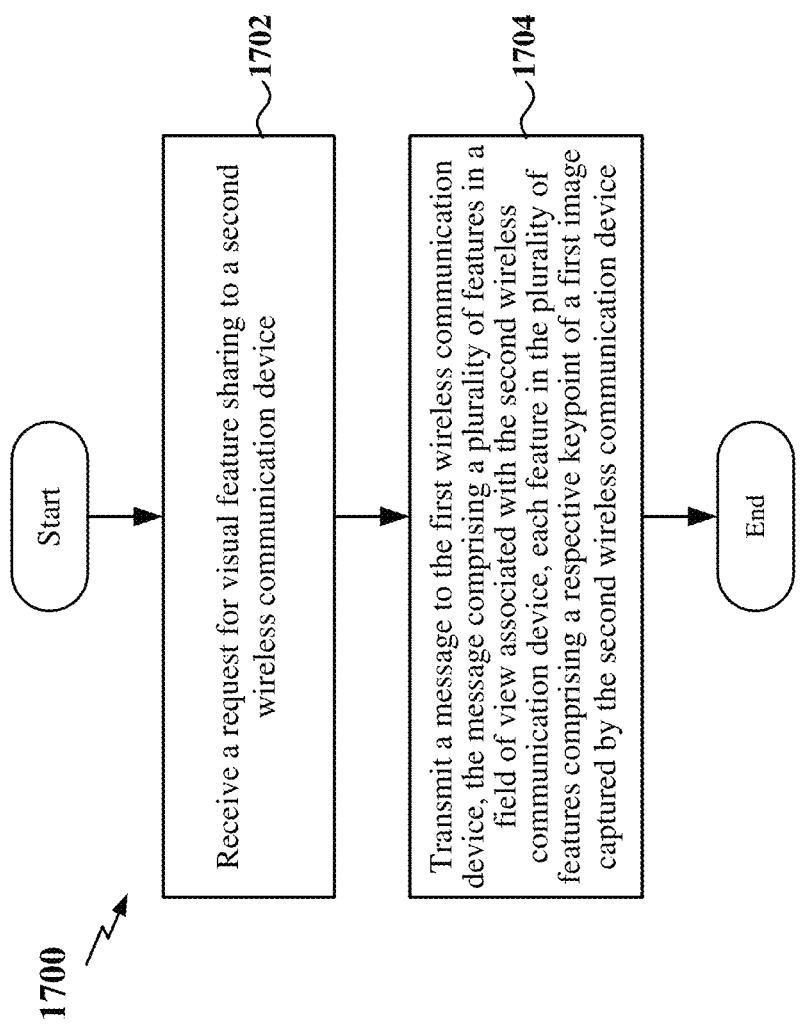
FIG. 17 is a flow chart of an exemplary process for visual feature sharing according to some aspects.

FIG. 17 is a flow chart of an exemplary process 1700 for visual feature sharing according to some aspects. As described below, some or all illustrated features may be omitted in a particular implementation within the scope of the present disclosure, and some illustrated features may not be required for implementation of all examples. In some examples, the method may be performed by the wireless communication device 1200, as described above and illustrated in FIG. 12, by a processor or processing system, or by any suitable means for carrying out the described functions.

At block 1702, the wireless communication device may (e.g., a second wireless communication device) may receive a request for visual feature sharing from a first wireless communication device. For example, the communication and processing circuitry 1242, together with the visual feature sharing circuitry 1244 and transceiver 1210, shown and described above in connection with FIG. 12, may provide a means to receive the request.

At block 1704, the second wireless communication device may transmit a message to the first wireless communication device. The message can include a plurality of features in a field of view associated with the second wireless communication device. Each feature in the plurality of first features may include a respective keypoint of an image captured by the second wireless communication device. In some examples, each feature in the plurality of features further includes a respective feature descriptor corresponding to the respective keypoint. In some examples, the message further includes a timestamp indicating a time at which the plurality of features were obtained at the second wireless communication device. In some examples, the second wireless communication device may transmit a respective set of features to the first wireless communication device for each of a plurality of images captured by the second wireless communication device.

In some examples, the second wireless communication device may further transmit a global pose of the second wireless communication device in a coordinate system. In some examples, the message may further include a relative pose of a sensor on the second wireless communication device with respect to a reference frame associated with the second wireless communication device. In some examples, the reference frame corresponds to a vehicle body frame associated with the second wireless communication device.

In some examples, the request may include an indication of the field of view. In some examples, the indication may include a coordinate system of the field of view. In other examples, the indication may include a differential value with respect to a previous set of features received from the second wireless communication device.

In some examples, the second wireless communication device may further perform a sidelink ranging operation between the first wireless communication device and the second wireless communication device. The second wireless communication device may receive the request for visual feature sharing during the sidelink ranging operation. In some examples, the second wireless communication device may transmit the message within a sidelink ranging measurement report.

In some examples, the message includes at least one of a unicast sidelink message, a multicast sidelink message, or a broadcast sidelink message. In some examples, the second wireless communication device may transmit the message to the first wireless communication device via a network entity in wireless communication with the first wireless communication device and the second wireless communication device. The communication and processing circuitry 1242, together with the visual feature sharing circuitry 1244 and transceiver 1210, shown and described above in connection with FIG. 12, may provide a means to transmit the message.

In one configuration, the wireless communication device 1200 includes means for receiving a request for visual feature sharing from a first wireless communication device and means for transmitting a message to the first wireless communication device, the message including a plurality of features in a field of view associated with the second wireless communication device, where each feature in the plurality of features includes a respective keypoint of an image captured by the second wireless communication device. In one aspect, the aforementioned means may be the processor 1204 shown in FIG. 12 configured to perform the functions recited by the aforementioned means. In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1, 3, 7, and/or 11, and utilizing, for example, the processes and/or algorithms described herein in relation to FIG. 17.

The processes and/or algorithms shown in FIGS. 13-17 may include additional aspects, such as any single aspect or any combination of aspects described below and/or in connection with one or more other processes described elsewhere herein.

Aspect 1: A method operable at a first wireless communication device, the method comprising: transmitting a request for visual feature sharing to a second wireless communication device; receiving a message from the second wireless communication device, the message comprising a plurality of first features of a first image captured by the second wireless communication device in a first field of view, each first feature in the plurality of first features comprising a respective first keypoint of the first image; obtaining a plurality of second features of a second image captured by the first wireless communication device in a second field of view, each second feature in the plurality of second features comprising a respective second keypoint of the second image; and calculating a relative pose of the first wireless communication device with respect to the second wireless communication device based on an association between the plurality of first features and the plurality of second features.

Aspect 2: The method of aspect 1, wherein each first feature in the plurality of first features further comprises a respective first feature descriptor corresponding to the respective first keypoint, and each second feature in the plurality of second features further comprises a respective second feature descriptor corresponding to the respective second keypoint, and further comprising: associating the plurality of first features with the plurality of second features based on the first keypoints, the second keypoints, the first feature descriptors, and the second feature descriptors.

Aspect 3: The method of aspect 1 or 2, The method of claim 1, further comprising: receiving a first global pose of the second wireless communication device in a coordinate system; and calculating a second global pose of the first wireless communication device in the coordinate system based on the first global pose and the relative pose.

Aspect 4: The method of aspect 3, wherein the message further comprises an additional relative pose of a sensor on the second wireless communication device with respect to a reference frame associated with the second wireless communication device, and wherein the calculating the second global pose further comprises: calculating the second global pose further based on the additional relative pose.

Aspect 5: The method of aspect 4, wherein the reference frame corresponds to a vehicle body frame associated with the second wireless communication device.

Aspect 6: The method of any of aspects 1 through 5, wherein the message further comprises a timestamp indicating a first time at which the plurality of first features were obtained at the second wireless communication device, and the calculating the relative pose further comprises: determining mobility information of the first wireless communication device between the first time and a second time at which the plurality of second features were obtained at the first wireless communication device; and calculating the relative pose further based on the mobility information.

Aspect 7: The method of any of aspects 1 through 6, wherein the request further comprises an indication of the first field of view.

Aspect 8: The method of aspect 7, wherein the indication comprises a coordinate system of the first field of view.

Aspect 9: The method of aspect 7, wherein the indication comprises a differential value with respect to a previous set of features received from the second wireless communication device.

Aspect 10: The method of any of aspects 1 through 9, wherein the transmitting the request for visual feature sharing further comprises: performing a sidelink ranging operation between the first wireless communication device and the second wireless communication device; and transmitting the request for visual feature sharing during the sidelink ranging operation.

Aspect 11: The method of aspect 10, wherein the receiving the message further comprises: receiving the message within a sidelink ranging measurement report.

Aspect 12: The method of any of aspects 1 through 11, wherein the message comprises at least one of a unicast sidelink message, a multicast sidelink message, or a broadcast sidelink message.

Aspect 13: The method of any of aspects 1 through 8, wherein the receiving the message further comprises: receiving the message from the second wireless communication device via a network entity in wireless communication with the first wireless communication device and the second wireless communication device.

Aspect 14: A method operable at a wireless communication device, the method comprising: receiving a request for visual feature sharing from another communication device; and transmitting a message to the other communication device, the message comprising a plurality of features in a field of view associated with the wireless communication device, each feature in the plurality of features comprising a respective keypoint of an image captured by the wireless communication device.

Aspect 15: The method of aspect 14, wherein each feature in the plurality of features further comprises a respective feature descriptor corresponding to the respective keypoint.

Aspect 16: The method of aspect 14 or 15, further comprising: transmitting a global pose of the wireless communication device in a coordinate system.

Aspect 17: The method of aspect 16, wherein the message further comprises a relative pose of a sensor on the wireless communication device with respect to a reference frame associated with the wireless communication device.

Aspect 18: The method of aspect 16, wherein the reference frame corresponds to a vehicle body frame associated with the wireless communication device.

Aspect 19: The method of any of aspects 14 through 18, wherein the message further comprises a timestamp indicating a time at which the plurality of features were obtained at the wireless communication device.

Aspect 20: The method of any of aspects 14 through 19, wherein the request further comprises an indication of the field of view.

Aspect 21: The method of aspect 20, wherein the indication comprises a coordinate system of the field of view.

Aspect 22: The method of aspect 20, wherein the indication comprises a differential value over a past set of features transmitted to the other communication device.

Aspect 23: The method of any of aspects 14 through 22, wherein the receiving the request for visual feature sharing further comprises: performing a sidelink ranging operation between the other communication device and the wireless communication device; and receiving the request for visual feature sharing during the sidelink ranging operation.

Aspect 24: The method of aspect 23, wherein the transmitting the message further comprises: transmitting the message within a sidelink ranging measurement report.

Aspect 25: The method of any of aspects 14 through 24, wherein the message comprises at least one of a unicast sidelink message, a multicast sidelink message, or a broadcast sidelink message.

Aspect 26: The method of any of aspects 14 through 22, wherein the transmitting the message further comprises: transmitting the message to the other communication device via a network entity in wireless communication with the other communication device and the wireless communication device.

Aspect 27: The method of any of aspects 14 through 26, wherein the transmitting the message further comprises: transmitting a respective set of features to the other communication device for each of a plurality of images captured by the wireless communication device.

Aspect 28: A wireless communication device comprising a transceiver, a memory, and a processor coupled to the transceiver and the memory, the processor being configured to perform a method of any one of aspects 1 through 13 or 14 through 27.

Aspect 29: A wireless communication device comprising means for performing a method of any one of aspects 1 through 13 or 14 through 27.

Aspect 30: An article of manufacture comprising a non-transitory computer-readable medium having stored therein instructions executable by one or more processors of a wireless communication device to perform a method of any one of aspects 1 through 13 or 14 through 27.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3, 7, and/or 11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first wireless communication device, comprising:
    a transceiver;
    a memory; and
    one or more processors coupled to the transceiver and the memory, the one or more processors being configured to:
        transmit a request for visual feature sharing to a second wireless communication device via the transceiver, wherein the request comprises an indication of a first field of view, wherein the indication comprises a differential value with respect to the first field of view of a previous set of features received from the second wireless communication device;
        receive a message from the second wireless communication device via the transceiver, the message comprising a plurality of first features of a first image captured by the second wireless communication device in the first field of view, each first feature in the plurality of first features comprising a respective first keypoint of the first image;
        obtain a plurality of second features of a second image captured by the first wireless communication device in a second field of view, each second feature in the plurality of second features comprising a respective second keypoint of the second image; and
        calculate a relative pose of the first wireless communication device with respect to the second wireless communication device based on an association between the plurality of first features and the plurality of second features.

2. The first wireless communication device of claim 1, wherein each first feature in the plurality of first features further comprises a respective first feature descriptor corresponding to the respective first keypoint, and each second feature in the plurality of second features further comprises a respective second feature descriptor corresponding to the respective second keypoint, and wherein the one or more processors are further configured to:
    associate the plurality of first features with the plurality of second features based on the first keypoints, the second keypoints, the first feature descriptors, and the second feature descriptors.

3. The first wireless communication device of claim 1, wherein the one or more processors are further configured to:
    receive a first global pose of the second wireless communication device in a coordinate system; and
    calculate a second global pose of the first wireless communication device in the coordinate system based on the first global pose and the relative pose.

4. The first wireless communication device of claim 3, wherein the message further comprises an additional relative pose of a sensor on the second wireless communication device with respect to a reference frame associated with the second wireless communication device, and wherein the one or more processors are further configured to:
    calculate the second global pose further based on the additional relative pose.

5. The first wireless communication device of claim 4, wherein the reference frame corresponds to a vehicle body frame associated with the second wireless communication device.

6. The first wireless communication device of claim 1, wherein the message further comprises a timestamp indicating a first time at which the plurality of first features were obtained at the second wireless communication device, and wherein the one or more processors are further configured to:
    determine mobility information of the first wireless communication device between the first time and a second time at which the plurality of second features were obtained at the first wireless communication device; and
    calculate the relative pose further based on the mobility information.

7. The first wireless communication device of claim 1, wherein the indication comprises a coordinate system of the first field of view.

8. The first wireless communication device of claim 1, wherein the one or more processors are further configured to:
    perform a sidelink ranging operation between the first wireless communication device and the second wireless communication device; and
    transmit the request for visual feature sharing during the sidelink ranging operation.

9. The first wireless communication device of claim 8, wherein the one or more processors are further configured to:
    receive the message within a sidelink ranging measurement report.

10. The first wireless communication device of claim 1, wherein the message comprises at least one of a unicast sidelink message, a multicast sidelink message, or a broadcast sidelink message.

11. The first wireless communication device of claim 1, wherein the one or more processors are further configured to:

receive the message from the second wireless communication device via a network entity in wireless communication with the first wireless communication device and the second wireless communication device.

12. A wireless communication device, comprising:
a transceiver;
a memory; and
one or more processors coupled to the transceiver and the memory, the one or more processors being configured to:
receive a request for visual feature sharing from another wireless communication device via the transceiver, wherein the request comprises an indication of a field of view associated with the wireless communication device, wherein the indication comprises a differential value with respect to the field of view of a previous set of features transmitted to the other wireless communication device; and
transmit a message to the other wireless communication device via the transceiver, the message comprising a plurality of features in the field of view, each feature in the plurality of features comprising a respective keypoint of an image captured by the wireless communication device.

13. The wireless communication device of claim 12, wherein each feature in the plurality of features further comprises a respective feature descriptor corresponding to the respective keypoint.

14. The wireless communication device of claim 12, wherein the one or more processors are further configured to:
transmit a global pose of the wireless communication device in a coordinate system.

15. The wireless communication device of claim 14, wherein the message further comprises a relative pose of a sensor on the wireless communication device with respect to a reference frame associated with the wireless communication device.

16. The wireless communication device of claim 15, wherein the reference frame corresponds to a vehicle body frame associated with the wireless communication device.

17. The wireless communication device of claim 12, wherein the message further comprises a timestamp indicating a time at which the plurality of features were obtained at the wireless communication device.

18. The wireless communication device of claim 12, wherein the indication comprises a coordinate system of the field of view.

19. The wireless communication device of claim 12, wherein the one or more processors are further configured to:
perform a sidelink ranging operation between the other wireless communication device and the wireless communication device; and
receive the request for visual feature sharing during the sidelink ranging operation.

20. The wireless communication device of claim 19, wherein the one or more processors are further configured to:
transmit the message within a sidelink ranging measurement report.

21. The wireless communication device of claim 12, wherein the message comprises at least one of a unicast sidelink message, a multicast sidelink message, or a broadcast sidelink message.

22. The wireless communication device of claim 12, wherein the one or more processors are further configured to:
transmit the message to the other wireless communication device via a network entity in wireless communication with the other wireless communication device and the wireless communication device.

23. The wireless communication device of claim 12, wherein the one or more processors are further configured to:
transmit a respective set of features to the other wireless communication device for each of a plurality of images captured by the wireless communication device.

24. A method operable at a first wireless communication device, the method comprising:
transmitting a request for visual feature sharing to a second wireless communication device, wherein the request comprises an indication of a first field of view, wherein the indication comprises a differential value with respect to the first field of view of a previous set of features received from the second wireless communication device;
receiving a message from the second wireless communication device, the message comprising a plurality of first features in the first field of view associated with the second wireless communication device, each first feature in the plurality of first features comprising a respective first keypoint of a first image captured by the second wireless communication device;
obtaining a plurality of second features in a second field of view associated with the first wireless communication device, each second feature in the plurality of second features comprising a respective second keypoint of a second image captured by the first wireless communication device; and
calculating a relative pose of the first wireless communication device with respect to the second wireless communication device based on an association between the plurality of first features and the plurality of second features.

25. The method of claim 24, wherein each first feature in the plurality of first features further comprises a respective first feature descriptor corresponding to the respective first keypoint, and each second feature in the plurality of second features further comprises a respective second feature descriptor corresponding to the respective second keypoint, and further comprising:
associating the plurality of first features with the plurality of second features based on the first keypoints, the second keypoints, the first feature descriptors, and the second feature descriptors.

26. A method operable at a wireless communication device, the method comprising:
receiving a request for visual feature sharing from another wireless communication device, wherein the request comprises an indication of a field of view associated with the wireless communication device, wherein the indication comprises a differential value with respect to the field of view of a previous set of features transmitted to the other wireless communication device; and
transmitting a message to the other wireless communication device, the message comprising a plurality of features in the field of view, each feature in the plurality of features comprising a respective keypoint of an image captured by the wireless communication device.

* * * * *